United States Patent
Hwang et al.

(10) Patent No.: US 9,554,162 B2
(45) Date of Patent: Jan. 24, 2017

(54) APPARATUS FOR TRANSRECEIVING SIGNALS AND METHOD FOR TRANSRECEIVING SIGNALS

(71) Applicant: LG ELECTRONICS INC., Seoul (KR)

(72) Inventors: Soojin Hwang, Seoul (KR); Jongyeul Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/441,443

(22) PCT Filed: Nov. 11, 2013

(86) PCT No.: PCT/KR2013/010198
§ 371 (c)(1),
(2) Date: May 7, 2015

(87) PCT Pub. No.: WO2014/073927
PCT Pub. Date: May 15, 2014

(65) Prior Publication Data
US 2015/0304693 A1    Oct. 22, 2015

Related U.S. Application Data

(60) Provisional application No. 61/725,472, filed on Nov. 12, 2012.

(51) Int. Cl.
*H04N 21/236* (2011.01)
*H04N 21/434* (2011.01)
(Continued)

(52) U.S. Cl.
CPC ........ *H04N 21/23439* (2013.01); *H04N 1/646* (2013.01); *H04N 9/77* (2013.01);
(Continued)

(58) Field of Classification Search
CPC ................ H04N 19/186; H04N 21/236; H04N 21/23602; H04N 19/893; H04N 21/4342; H04N 21/234363; H04N 21/2362; H04N 21/4348; H04N 7/015
See application file for complete search history.

(56) References Cited

U.S. PATENT DOCUMENTS

2002/0030620 A1    3/2002  Cairns et al.
2009/0003435 A1    1/2009  Cho et al.
(Continued)

FOREIGN PATENT DOCUMENTS

EP    1542476 A2    6/2005
EP    1737240 A2    12/2006
(Continued)

OTHER PUBLICATIONS

Jia, et al.: "SVC Chroma Format Scalability", XP030007036, Joint Video Team (JVT) of ISO/IEC MPEG & ITU-T VCEG (ISO/IEC JTC1/SC29/WG11 and ITU-T SG16 Q.6), 23rd Meeting, San Jose, CA, USA Apr. 21-27, 2007, p. 2.
(Continued)

*Primary Examiner* — Benjamin R Bruckart
*Assistant Examiner* — Aklil Tesfaye
(74) *Attorney, Agent, or Firm* — LG Electronics Inc.

(57) ABSTRACT

The present invention relates to an apparatus for transreceiving signals and a method for transreceiving signals. One embodiment of the present invention provides a method for transmitting signals comprising the steps of: encoding video data; generating signaling information including video configuration metadata information, which can output the encoded video data as a plurality of video sampling formats; and multiplexing the encoded video data and the signaling information and then transmitting the multiplexed video data and the signaling information.

8 Claims, 24 Drawing Sheets

(51) Int. Cl.
| | |
|---|---|
| H04N 21/2343 | (2011.01) |
| H04N 7/01 | (2006.01) |
| H04N 21/2662 | (2011.01) |
| H04N 19/186 | (2014.01) |
| H04N 19/46 | (2014.01) |
| H04N 1/64 | (2006.01) |
| H04N 9/77 | (2006.01) |
| H04N 21/235 | (2011.01) |
| H04N 21/44 | (2011.01) |
| H04N 21/4405 | (2011.01) |
| H04N 21/6336 | (2011.01) |
| H04N 21/2362 | (2011.01) |
| H04N 21/84 | (2011.01) |
| H04N 19/187 | (2014.01) |
| H04N 19/33 | (2014.01) |

(52) U.S. Cl.
CPC ......... *H04N 19/186* (2014.11); *H04N 19/187* (2014.11); *H04N 19/33* (2014.11); *H04N 19/46* (2014.11); *H04N 21/2353* (2013.01); *H04N 21/2362* (2013.01); *H04N 21/234327* (2013.01); *H04N 21/234363* (2013.01); *H04N 21/2662* (2013.01); *H04N 21/4405* (2013.01); *H04N 21/44008* (2013.01); *H04N 21/6336* (2013.01); *H04N 21/84* (2013.01)

(56) References Cited

U.S. PATENT DOCUMENTS

2009/0147856 A1* 6/2009 Song ................... H04N 19/172
375/240.23
2009/0225869 A1 9/2009 Cho et al.
2012/0092453 A1* 4/2012 Suh ................... H04N 13/0066
348/43

FOREIGN PATENT DOCUMENTS

| JP | 2010-531609 A | 9/2010 |
| KR | 1020000038809 A | 7/2000 |
| KR | 1019990081409 | 10/2001 |
| KR | 1020040048702 A | 6/2004 |
| KR | 1020120019751 A | 3/2012 |

OTHER PUBLICATIONS

Park, et al.: "Requirement of Color Space Scalability", XP030007280, Joint Video Team (JVT) of ISO/IEC MPEG & ITU-T VCEG (ISO/IEC JTC1/SC29/WG11 and ITU-T SG16 Q.6), 25th Meeting, Shenzhen, CN, Oct. 21-26, 2007, page 3.
Haskell, et al.: "Chapter 9—MPEG-2 Scalability Techniques", XP055276898, Kluwer Academic Publ., Jan. 1, 2002, p. 196.
Chiang, et al.: "Hierarchial Coding of Digital Television", XP011420725, IEEE Communications Magazine, vol. 32, No. 5, May 1, 1994, p. 44.
Wang, et al.: "System and Transport Interface of SVC", XP011193022, IEEE Transactions on Circuits and Systems for Video Technology, vol. 17, No. 9, Sep. 1, 2007, pp. 1149-1163.
Schierl, et al.: "Scalable Video Coding over RTP and MPEG-2 Transport Stream in Broadcast and IPTV Channels", XP011284069, IEEE Wireless Communications, vol. 16, No. 5, Oct. 1, 2009, p. 69.

* cited by examiner

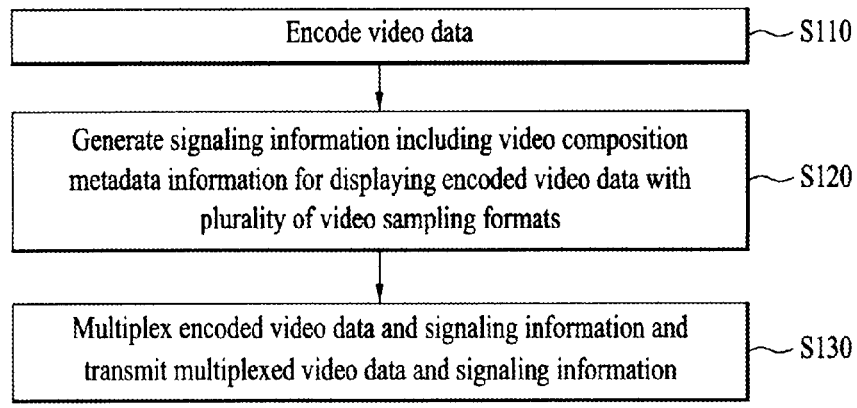

FIG. 10
4:2:2 progressive       4:2:0 (top field)       4:2:0 (bottom field)
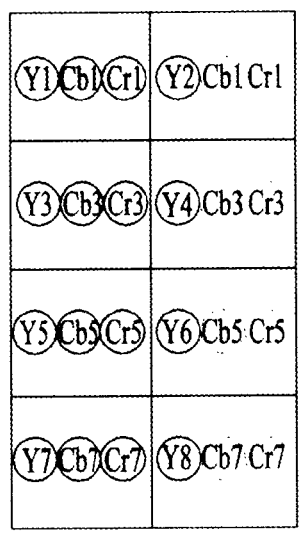
(a)
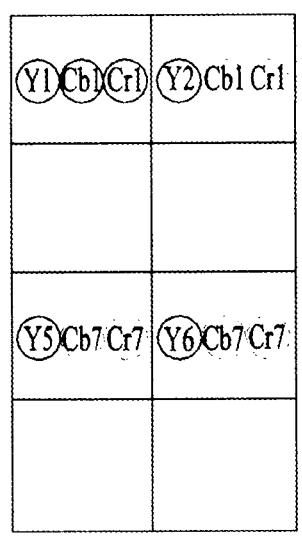
(b)
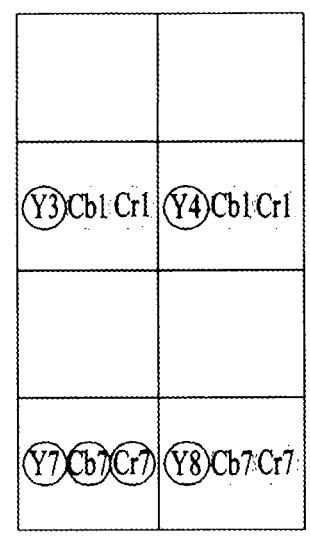
(c)

FIG. 13

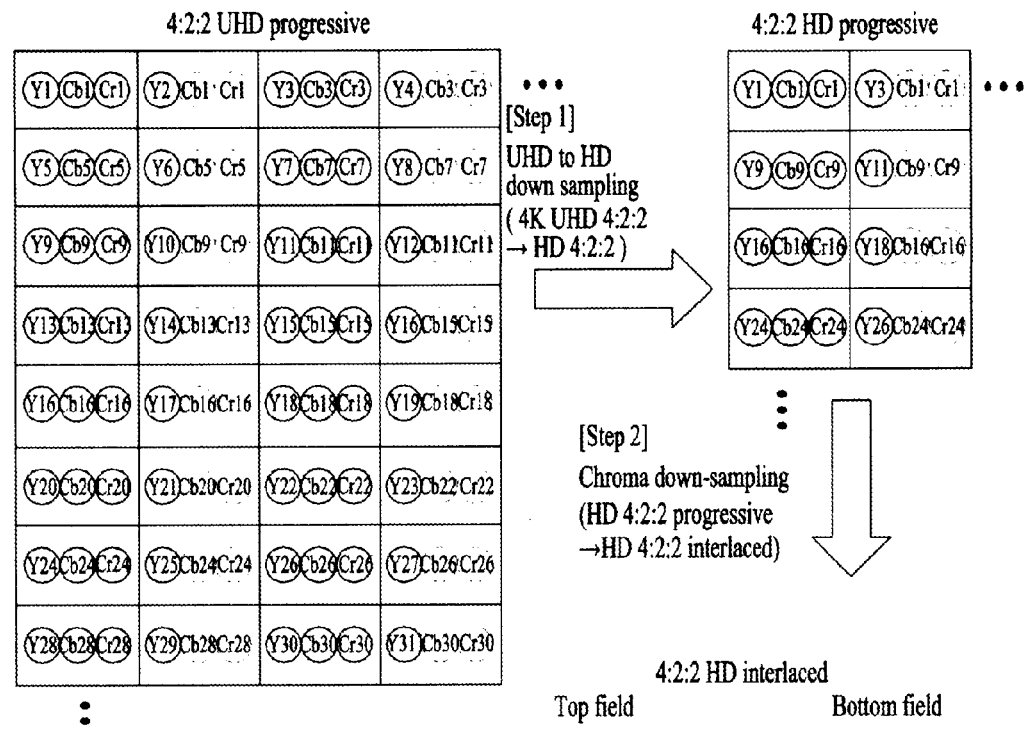

In this embodiment, 4:2:0 HD interlaced is extracted through 4:2:2 HD interlaced. Similarly, label of pixel refers to corresponding position of different format of image in each respective process and pixel values are not necessarily the same (scaling & filtering). In addition, during 4:2:0 chroma down-sampling, chroma value is allocated in consideration of coordination when videos are to be merged using progressive method, but not in field unit (e.g., Cb/Cr about Y16 is allocated as Cb/Cr 24).

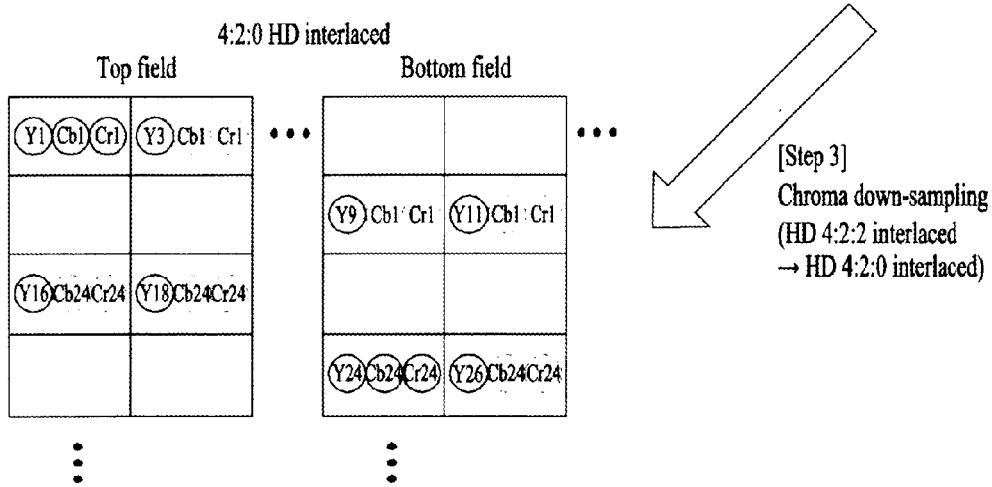

FIG. 15

| Syntax | No. of bits | Mnemonic |
|---|---|---|
| TS_program_map_section ( ) { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for (i=0; i< N; i++) { | | |
|         descriptor( ) | | |
|     } | | |
|     for (i=0; i< N1; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (i=0; i< N2; i++) { | | |
|             descriptor( ) | | |
|         } | | |
|     } | | |
|     CRC_32 | 32 | rpchof |
| } | | |

Position of UHD composition description – Information about enhancement layer 2 video element (descriptor of base layer element and enhancement layer 1 video element is disclosed in prior patent)

| Syntax | No. of bits | Format |
|---|---|---|
| UHD_program_type_descriptor { | | |
|     descriptor_tag | 8 | uimsbf |
|     offset_beta_value | 2 | uimsbf |
|     UHD_program_format_type | 8 | |
| } | | |

Chroma signals for 0x05-4:2:0 HD compatible, 4:2:0 UHD compatible, and 4:2:2 UHD video composition are configured as separate layers

FIG. 16

| Syntax | Description |
|---|---|
| Program map section ( ) { | |
| . | |
| . | |
| . | |
| stream type<br>elementary_PID<br>descriptor ( ) | 0 x 02 ( MPEG - 2 video codec )<br>0 x 109A<br>Descriptor associated with MPEG-2 video |
| stream_type<br>elementary_PID | 0 x A1 ( HEVC scalable layer video Codec )<br>0 x 109B |
| UHDTV_sub_stream_descriptor ( ) | Information required to configure 4:2:0 UHD image using information associated with EL1 and base layer |
| stream_type<br>elementary_PID | 0 x A2 ( HEVC video codec )<br>0 x 109C |
| UHD_compositon_descriptor ( )<br>.<br>.<br>.<br>} | Information associated with EL2 and information for restoration of 4:2:2 UHD image |

FIG. 18

| UHD_video_type | Description |
| --- | --- |
| 0000 ~ 0010 | reserved |
| 0011 | 3840 x 2160, 60p |
| 0100 | 3840 x 2160, 120p |
| 0101 | 4096 x 2160, 60p |
| 0110 | 4096 x 2160, 120p |
| 0111 | 7680 x 4320, 60p |
| 1000 | 7680 x 4320, 120p |
| 1001 | 8192 x 4320, 60p |
| 1010 | 8192 x 4320, 120p |
| 1011 - 1111 | reserved |

FIG. 19

| original_UHD_video_chroma_subsampling_type | Description |
| --- | --- |
| 00 | 4:2:0 |
| 01 | 4:2:2 |
| 10 | 4:4:4 |
| 11 | reserved |

FIG. 20

| EL2_video_resolutio | Description |
|---|---|
| 000 | 960x540 |
| 001 | 1920x1080 |
| 010 | 1920x2160 |
| 011 | 3840x2160 |
| 100 | 3840x4320 |
| 110 - 111 | reserved |

FIG. 21

| EL2_video_type | Description |
|---|---|
| 00 | Y |
| 01 | Cb |
| 10 | Cr |
| 11 | reserved |

FIG. 22

| Syntax | No. of bits | Mnemonic |
|---|---|---|
| service_description_section ( ) { | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   transport_stream_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   original_network_id | 16 | uimsbf |
|   reserved_future_use | 8 | bslbf |
|   for (i=0; i< N; i++) { | | |
|     service_id | 16 | uimsbf |
|     reserved_future_use | 6 | bslbf |
|     EIT_schedule_flag | 1 | bslbf |
|     EIT_present_following_flag | 1 | bslbf |
|     running_status | 3 | uimsbf |
|     free_CA_mode | 1 | bslbf |
|     descriptors_loop_length | 12 | uimsbf |
|     for (j=0; j<N; j++) { | | |
|       descriptor() | | |
|     } | | |
|   } | | |
|   CRC_32 | 32 | rpchof |
| } | | |

UHD_program_descriptor() + UHD_composition_descriptor
(In this case, add field component_tag)

FIG. 23

| Syntax | No. of bits | Mnemonic |
|---|---|---|
| event_information_section ( ) { | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   service_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   transport_stream_id | 16 | uimsbf |
|   original_network_id | 16 | uimsbf |
|   segment_last_section_number | 8 | uimsbf |
|   last_table_id | 8 | uimsbf |
|   for (i=0; i< N; i++) { | | |
|     event_id | 16 | uimsbf |
|     start_time | 40 | bslbf |
|     duration | 24 | uimsbf |
|     running_status | 3 | uimsbf |
|     free_CA_mode | 1 | bslbf |
|     descriptors_loop_length | 12 | uimsbf |
|     for (i=0; i< N; i++) { | | |
|       descriptor() | | |
|     } | | |
|   } | | |
|   CRC_32 | 32 | rpchof |
| } | | | descriptor() → UHD_program_descriptor() + UHD_composition_descriptor (In this case, add field component_tag)

FIG. 24

| Syntax | No. of bits | Format |
|---|---|---|
| terrestrial_virtual_channel_table_section ( ) { | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channel_in_section | 8 | uimsbf |
|   for (i=0; i< num_channel_in_section; i++) { | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hid_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for (i=0; i<N; i++) { | | |
|       descriptor( ) | | |
|     } | | |
|   } | | |
| } | | | service_type → It can be determined as parameterized service (0x07) or extended parameterized service (0x09) or new DTV service scalable UHDTV (0x10)

descriptor( ) → UHD_program_type_descriptor + UHD_composition_descriptor

FIG. 25

| sei_payload( payloadType, payloadSize ) { | Category | Descriptor |
|---|---|---|
| | | |
| if( payloadType == 52 ) | | |
| UHDTV_scalable_chroma_service_info( payloadSize ) | 5 | |

| UHDTV_scalable_chroma_service_info( payloadSize ) { | C | Descriptor |
|---|---|---|
| UHD_program_format_type | 5 | u(8) |
| if( UHD_program_format_type == '0x05' ) { | | |
| UHD_composition_metadata | | |
| } | | |
| } | | |

APPARATUS FOR TRANSRECEIVING SIGNALS AND METHOD FOR TRANSRECEIVING SIGNALS

This application is a National Stage Application of International Application No. PCT/KR2013/010198, filed Nov. 11, 2013, and claims the priority to and benefit of U.S. Provisional Application No. 61/725,472, filed Nov. 12, 2012, each of which is hereby incorporated by reference in its entirety for all purposes as if fully set forth herein.

TECHNICAL FIELD

The present invention relates to a method and apparatus for transmitting and receiving a signal.

BACKGROUND ART

As video signal processing speed has increased, research has been conducted into a method of encoding/decoding an ultra high definition (UHD) video. In addition, research has also been conducted into a method of processing an HD video as well as UHD without any trouble when a UHD video is received using a conventional HD receiver.

However, although conventional HD broadcasting is used based on 4:2:0 chroma subsampling format, 4:2:2 or 4:4:4 chroma subsampling format may be used for an HD video in order to provide more enhanced color. For example, in case of broadcasting with 4:2:2 format (or 4:4:4 format), the format is not compatible with a conventional HDTV, and thus there is a problem in that a receiver that receives a conventional broadcasting signal cannot appropriately realize HD broadcasting.

When a different chroma subsampling method from a conventional chroma subsampling method is used for high quality broadcasting, there is a need for a method of also receiving/outputting a video signal by a conventional HDTV without any trouble. A compatibility method of a conventional 4:2:0 chroma subsampling method and a 4:2:2 chroma subsampling method is required, and a compatibility method of a progressive method and an interlaced method for a scan method is also required. However, at present, there is a problem in that there is no solution for the methods.

DISCLOSURE

Technical Problem

An object of the present invention devised to solve the problem lies in a method and apparatus for transmitting and receiving a signal, for providing compatibility with a sub-sampling format of video data.

Another object of the present invention devised to solve the problem lies in a method and apparatus for transmitting and receiving a signal, for providing a high resolution video with different video sampling formats while providing a compatible video sampling format with an existing broadcasting receiver.

Technical Solution

The object of the present invention can be achieved by providing a method of transmitting a signal, the method including encoding video data, generating signaling information including video composition metadata information (UHD_composition_metadata) for displaying the encoded video data with a plurality of video sampling formats, and multiplexing the encoded video data and the signaling information and transmitting the multiplexed video data and signaling information.

The encoded video data may include video data of sampling at a ratio of 4:2:2 of a luminance component Y and chroma components Cb and Cr.

The video data of sampling at a ratio of 4:2:2 of the luminance component Y and the chroma components Cb and Cr may include video data of sampling at a ratio of 4:2:0 of the luminance component Y and the chroma components Cb and Cr, residual data of the chroma components Cb and Cr, and the UHD_composition_metadata.

The UHD_composition_metadata may indicate that the encoded video data includes video data of sampling at a ratio of 4:2:0 of the luminance component Y and the chroma components Cb and Cr, and residual data of the chroma components Cb and Cr.

In another aspect of the present invention, provided herein is a method of receiving a signal, the method including demultiplexing signaling information including video streams and video composition metadata information (UHD_composition_metadata) indicating that the video streams are capable of being displayed with a plurality of video sampling formats, decoding the demultiplexed signaling information, and decoding video data transmitted to at least one of the video streams based on the UHD_composition_metadata.

The video streams may include video data of sampling at a ratio of 4:2:2 of a luminance component Y and chroma components Cb and Cr. The video data of sampling at a ratio of 4:2:2 of the luminance component Y and the chroma components Cb and Cr may include video data of sampling at a ratio of 4:2:0 of the luminance component Y and the chroma components Cb and Cr, residual data of the chroma components Cb and Cr, and the UHD_composition_metadata.

The UHD_composition_metadata may indicate that the video streams include video data of sampling at a ratio of 4:2:0 of the luminance component Y and the chroma components Cb and Cr, and residual data of the chroma components Cb and Cr.

In another aspect of the present invention, provided herein is a signal transmitting apparatus including an encoder for encoding video data, a signaling information generator for generating signaling information including video composition metadata information (UHD_composition_metadata) for displaying the encoded video data with a plurality of video sampling formats, and a multiplexer for multiplexing the encoded video data and the signaling information.

In another aspect of the present invention, provided herein is a signal receiving apparatus including a demultiplexer for demultiplexing signaling information including video streams and video composition metadata information (UHD_composition_metadata) indicating that the video streams are capable of being displayed with a plurality of video sampling formats, a signaling information decoder for decoding the demultiplexed signaling information, and a decoder for decoding video data transmitted to at least one of the video streams based on the UHD_composition_metadata.

Advantageous Effects

According to embodiments of the present invention, video data may be transmitted and received to provide compatibility with subsampling format of video data.

According to embodiments of the present invention, while providing a compatible video sampling format with an existing broadcasting receiver, a high resolution video with a different video sampling format may be transmitted and received.

According to embodiments of the present invention, compatibility with an interlaced method of HD system for supporting only an existing 4:2:0 chroma subsampling format may be provided and a high resolution video with a different chroma subsampling format may also be provided.

According to embodiments of the present invention, an HDTV receiver may also receive an HD video signal through an UHDTV broadcasting channel and a UHD receiver may also receive a signal according to chroma subsampling format supported by each receiver.

DESCRIPTION OF DRAWINGS

FIG. 1 is a diagram illustrating a signal transmitting method according to an embodiment of the present invention.

FIG. 2 is a diagram illustrating a concept of sampling of a signal of luminance Y and signals of chroma Cb and Cr of chroma subsampling format when video format is progressive.

FIG. 10 is a diagram illustrating an example of a scanning method according to video sampling.

FIG. 13 is a diagram illustrating a third example of changing a high resolution video to low resolution video data with a compatible scanning method.

FIG. 15 is a diagram illustrating signaling information for displaying a video according to an embodiment of the present invention.

FIG. 16 is a diagram illustrating a detailed syntax value of signaling information according to an embodiment of the present invention.

FIG. 18 is a diagram illustrating a value of information indicating a resolution and frame rate of the aforementioned video.

FIG. 19 is a diagram illustrating information about chroma subsampling format of an original UHD video.

FIG. 20 illustrates resolution information about residual data of video data.

FIG. 21 illustrates information about a signal transmitted in an enhancement layer.

FIG. 22 illustrates the case in which the aforementioned descriptors are included in other signaling information.

FIG. 23 illustrates the case in which illustrated descriptors are included in other signaling information.

FIG. 24 is illustrates the case in which illustrated descriptors are included in other signaling information.

FIG. 25 illustrates syntax of a payload of an SEI region of video data according to an embodiment of the present invention.

BEST MODE

Hereinafter, the present invention will be described in detail by explaining exemplary embodiments of the invention with reference to the attached drawings.

FIG. 1 is a diagram illustrating a signal transmitting method according to an embodiment of the present invention.

Video data is encoded (S110). When the video data is encoded, video composition metadata information (UHD_composition_metadata) as encoding information of video data may be added to encoded video data according to an embodiment of the present invention that will be described below.

The encoded video data may include video data of sampling at a ratio of 4:2:2 of a luminance component Y and chroma components Cb and Cr. In addition, video data of sampling at a ratio of 4:2:2 of the luminance component Y and the chroma components Cb and Cr may include video data of sampling at a ratio of 4:2:0 of the luminance component Y and the chroma components Cb and Cr, and residual data of the chroma components Cb and Cr, and UHD_composition_metadata. A configuration of the encoded video data and the UHD_composition_metadata will be described in detail with reference to FIG. 7 (UHD_composition_metadata) and FIG. 25.

Figure 8:
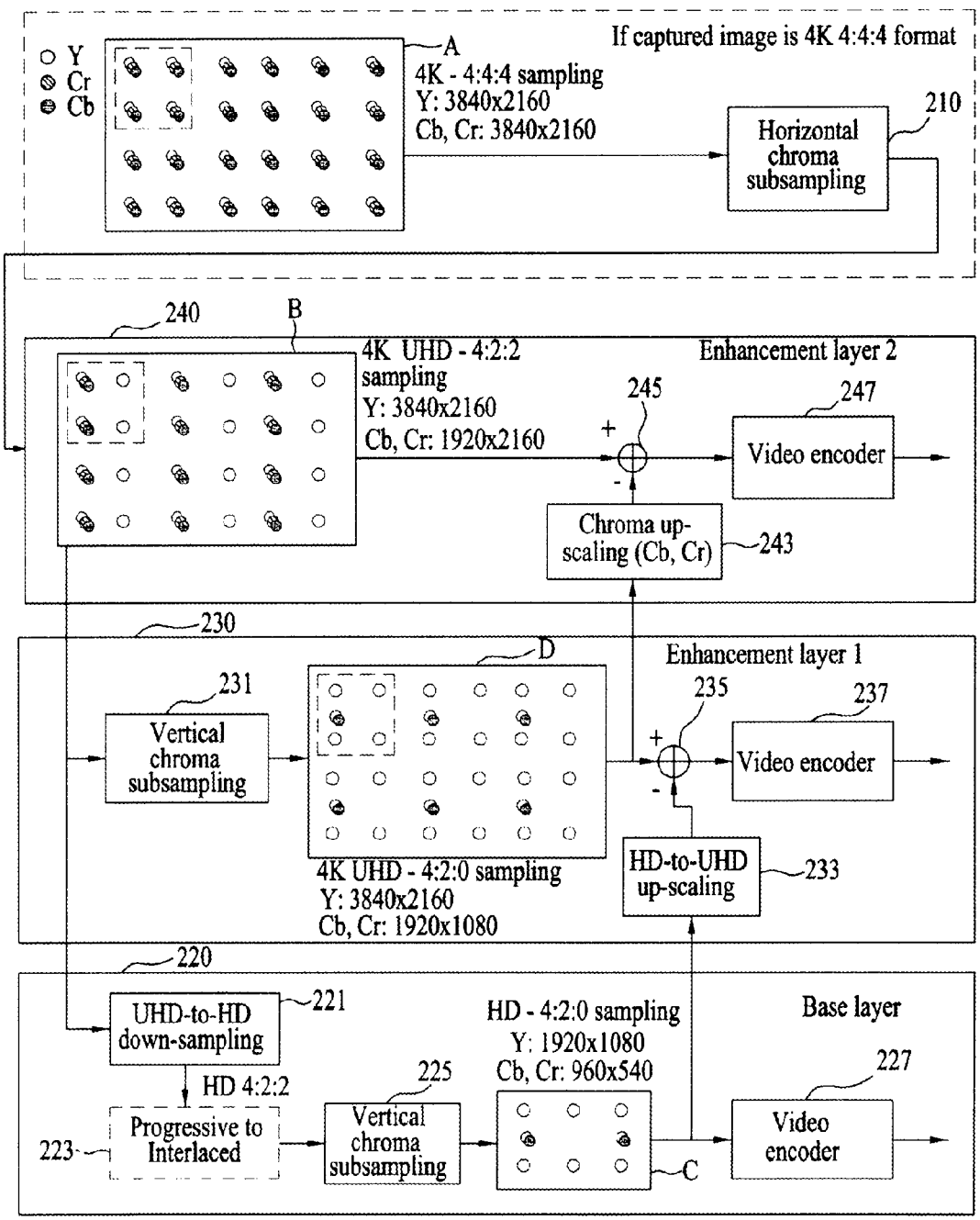
FIG. 8 is a diagram illustrating a signal transmitting apparatus according to an embodiment of the present invention.
Figure 9:
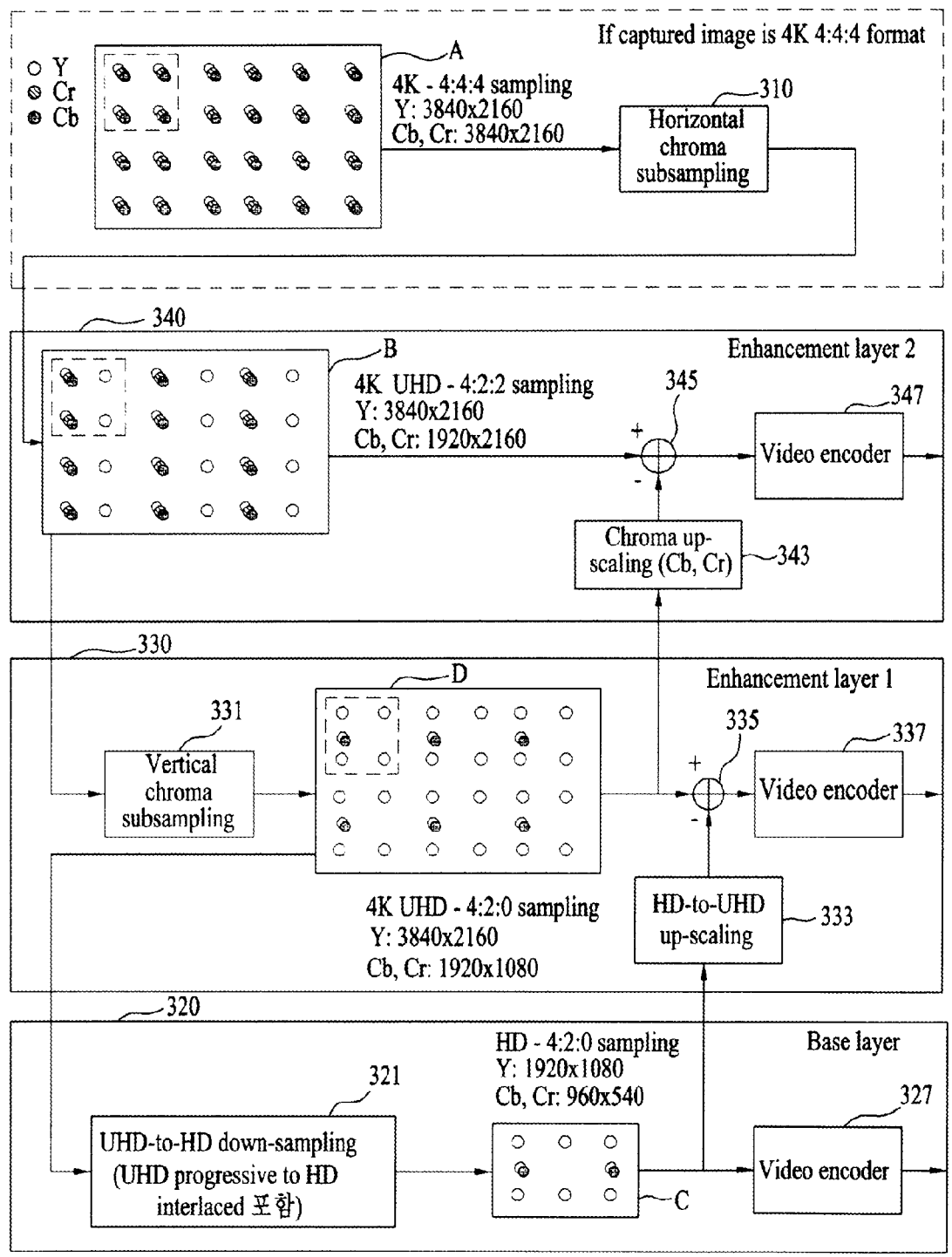
FIG. 9 is a diagram of a signal transmitting apparatus according to another embodiment of the present invention.

Video data may be scalably encoded to various layer data items according to subsampling and resolution. An example of encoding video data is illustrated in FIGS. 8 and 9. In addition, when a scanning method needs to be changed according to subsampling and resolution of video data during encoding, the video data may be encoded by an encoder so as to change the scanning method of the video data through a method of FIGS. 11 to 13.

When the encoded video data is added to a broadcasting signal and transmitted, signaling information including UHD_composition_metadata for displaying the encoded video data with video sampling format is generated (S120). The UHD_composition_metadata may indicate that the encoded video data includes video data with sampling at a ratio of 4:2:0 of the luminance component Y and the chroma components Cb and Cr and residual data of the chroma components Cb and Cr. An example of signaling information different from the video data is shown in FIGS. 15 to 24.

The encoded video data and the signaling information are multiplexed and the multiplexed video data and the multiplexed signaling information are transmitted (S130). When the transmitted data is not a broadcasting signal, a process for generating the video data and the multiplexed signaling information is omitted, and only the signaling information in the video data region described in S10 is encoded and transmitted together with the video data.

FIG. 2 is a diagram illustrating a concept of sampling of a signal of luminance Y and signals of chroma Cb and Cr of chroma subsampling format when video format is progressive. When video format is progressive, if the signal of luminance Y and the signals of chroma Cb and Cr have a ratio of 4:4:4, each pixel is displayed with using all the signal of luminance Y and the signals of chroma Cb and Cr and a ratio of the signal of luminance Y and the signals of chroma Cb and Cr is 1:1:1 in each pixel.

When the ratio of the signal of luminance Y and the signals of chroma Cb and Cr is 4:2:2, the signals of the chroma Cb and Cr are each sampled only for times while the signal of the luminance Y is sampled eight times in 8 pixel units of 4×2.

When the ratio of the signal of luminance Y and the signals of chroma Cb and Cr is 4:2:0, the signals of the chroma Cb and Cr are horizontally sampled twice and are vertically sampled once while the signal of the luminance Y is sampled eight times in 8 pixel units of 4×2.

Figure 3:
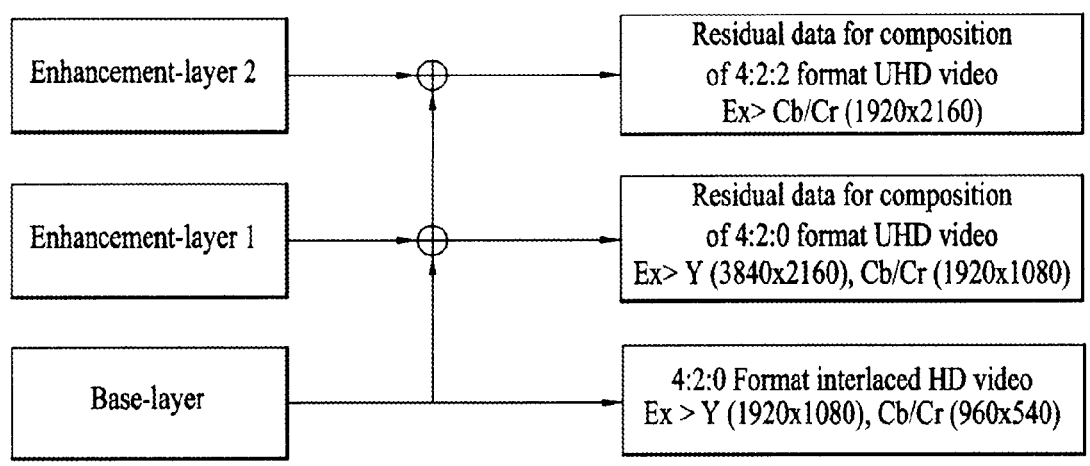
FIG. 3 is a diagram illustrating a method of encoding a UHD video as a high resolution video.

FIG. 3 is a diagram illustrating a method of encoding a UHD video as a high resolution video.

The UHD video may be encoded using a scalable video coding method. In this case, the UHD video may video format of 4:2:2 progressive format that is compatible with an HD video of 4:2:0 interlaced format.

For example, HD data of a conventional 4:2:0 interlaced method is encoded to base layer data. In this case, the base layer data may be the HD data of a conventional 4:2:0 interlaced method, and in this case, a Y signal may have a resolution of 1920×1080 and Cb/Cr signals may have a resolution of 960×540.

A UHD image is upscaled to an HD signal and then residual signals of residual luma and chroma for composition of a required 4:2:0 UHD signal are encoded to enhancement layer 1 data. In this case, the Y signal may have a resolution of 3840×2160 and the Cb/Cr signals may have a resolution of 1920×1080.

Enhancement layer 2 data may be generated by encoding residual data of a chroma component for composition of 4:2:2 format UHD. In this case, the Cb/Cr signals may have a resolution of 1920×2160.

A receiver may merge base layer data and the enhancement layer 1 data and display a 4:2:0 UHD broadcasting signal or may merge the base layer data and the data of enhancement layers 1 and 2 and display a 4:2:2 UHD broadcasting signal.

Figure 4:
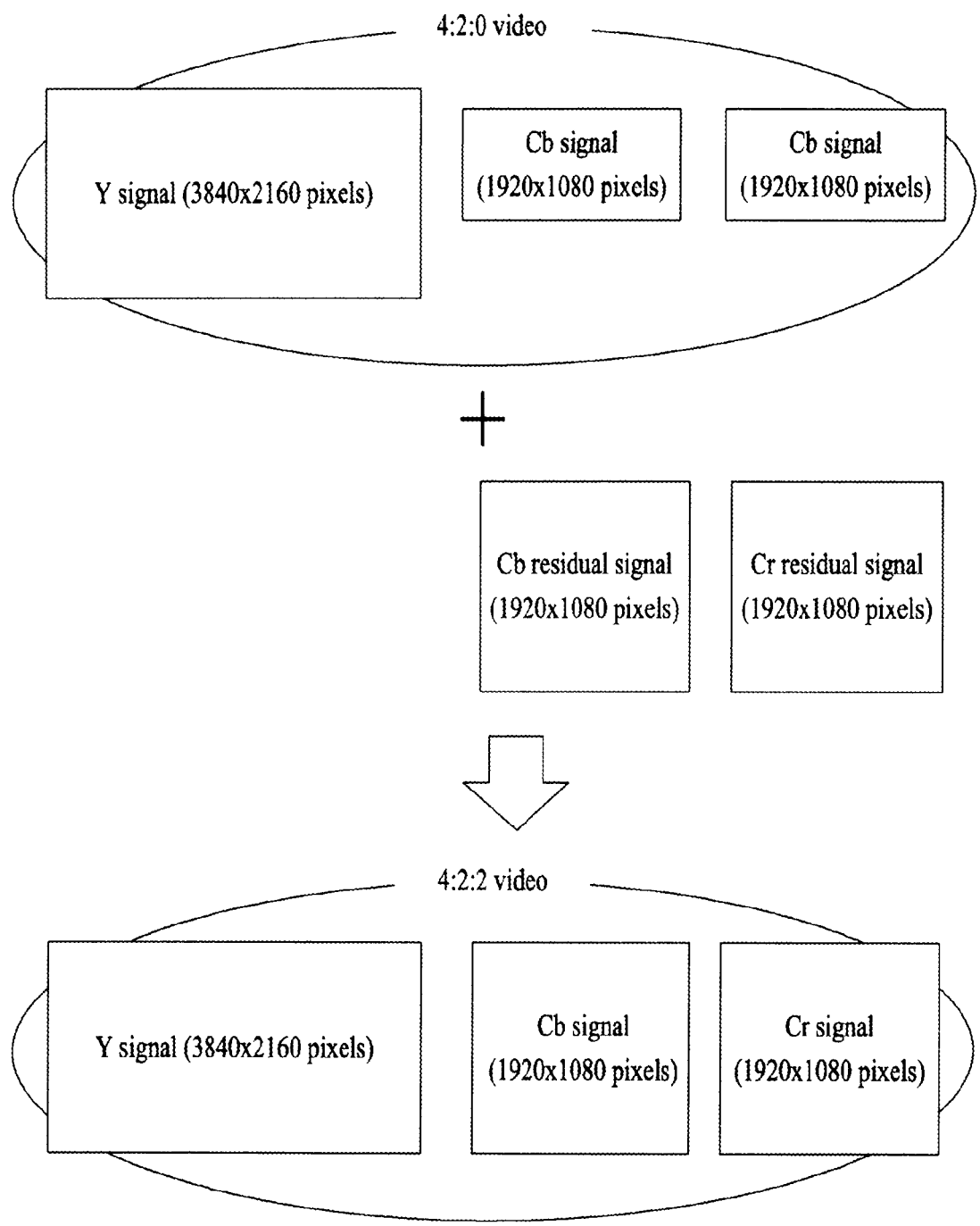
FIG. 4 is a diagram illustrating an example of converting 4:2:0 sampling video data into 4:2:2 sampling video data.

FIG. 4 is a diagram illustrating an example of converting 4:2:0 sampling video data into 4:2:2 sampling video data. For example. 4K video data of 4:2:0 sampling may include 3840×2160 of a signal of luminance Y and 1920×1080 of signals of chroma Cb and Cr.

Here, when 1920×1080 of the signals of chroma Cb and Cr are added, 4:2:2 sampling video data may be formed. The data may include 3840×2160 of signal of luminance Y and 1920×2160 of residual signals of chroma Cb and Cr. Accordingly, the residual signals of chroma Cb and Cr may be added according to resolution of two video data items to generate higher sampling video data for compatibility between 4:2:2 sampling video data and 4:2:0 sampling video data. Accordingly, the residual data of chroma Cb and Cr may be added to 4:2:0 sampling video data to generate 4:2:2 sampling UHD video data.

Figure 5:
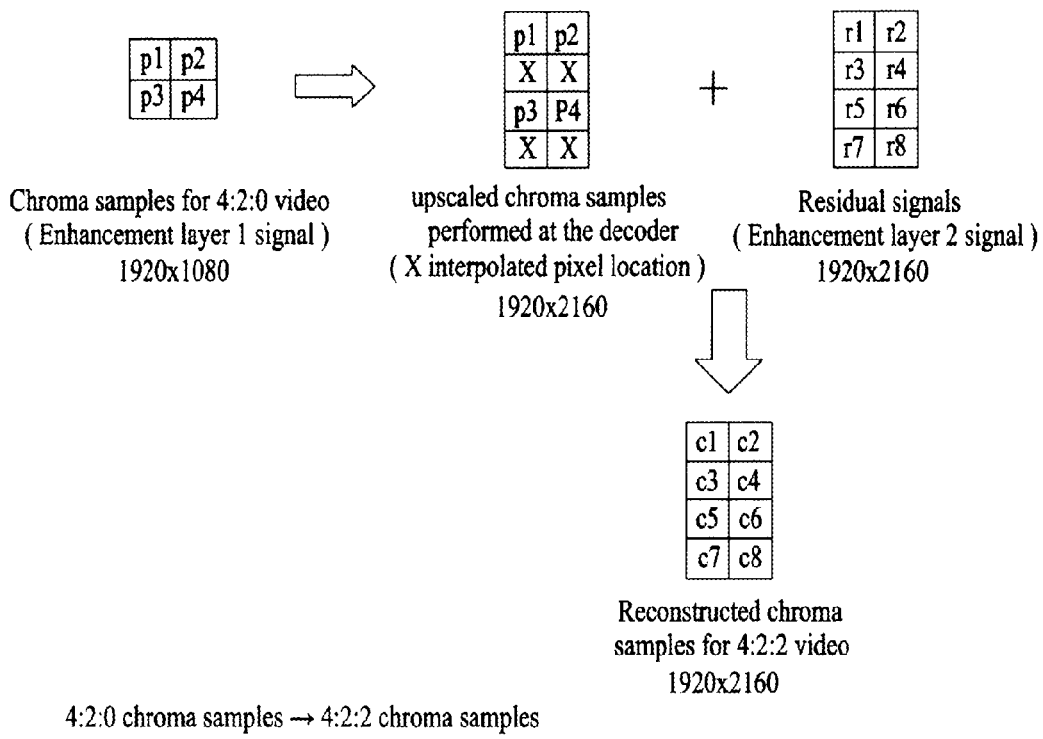
FIG. 5 is a diagram illustrating an upsampling.

FIG. 5 is a diagram illustrating an upsampling. FIG. 5 illustrates an example of generating 4:2:2 sampling video data using the enhancement layer 1 data and the enhancement layer 2 data, as illustrated in FIG. 3.

Upon receiving 4:2:0 sampling enhancement layer 1 data p1 to p4, a receiver upscales the data. A portion denoted by X indicates a position of an interpolated pixel.

Enhancement layer 2 data of a chroma signal is residual data r1 to r8 of a chroma component of high resolution video data. Accordingly, the enhancement layer 2 data includes pixel data with higher resolution than the enhancement layer 1 data. Accordingly, 4:2:2 data may be generated using the upscaled enhancement layer 1 chroma data and enhancement layer 2 chroma data.

FIG. 5 illustrates a process for converting 4:2:0 chroma subsampling format of 4K video into 4:2:2 chroma subsampling format when high resolution data is a 4K UHD video. In order to convert 4:2:0 UHD video into 4:2:2 UHD video, residual data of chroma Cb/Cr is further used. When chroma samples of existing color signals Cb/Cr are double-upscaled in a vertical direction and then merged with residual data of a chroma component of UHD video as enhancement layer 2 data so as to be restored, chroma data for composition of 4:2:2 sampling video may be acquired. A UHD receiver for supporting 4:2:2 format may merge base layer data, enhancement layer 1 data, and enhancement layer 2 data so as to finally acquire a 4:2:2 UHD broadcasting signal.

Figure 6:
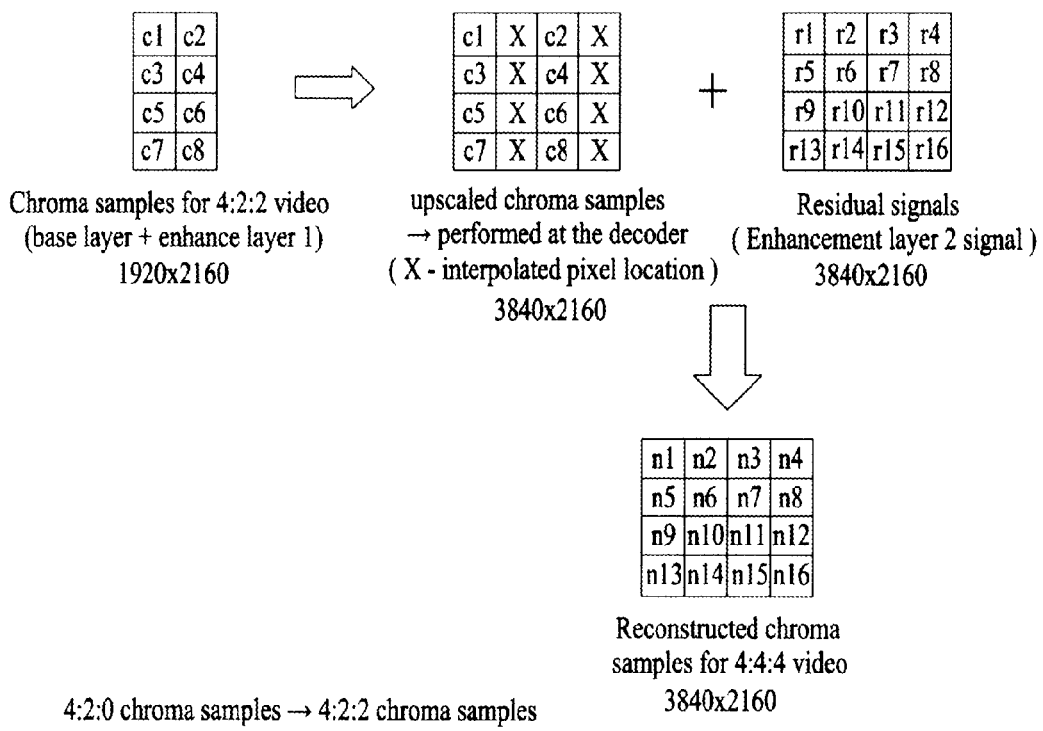
FIG. 6 is a diagram illustrating an upsampling process.

FIG. 6 is a diagram illustrating an upsampling process. FIG. 6 illustrates an example of generating 4K video data of 4:4:4 chroma sample data using 4K video data of 4:2:2 chroma sample data.

Upon receiving 4:2:0 sampling base layer data and enhancement layer 1 data c1 to c8, a receiver upscales the data. A portion denoted by X indicates a portion of an interpolated pixel.

Figure 7:
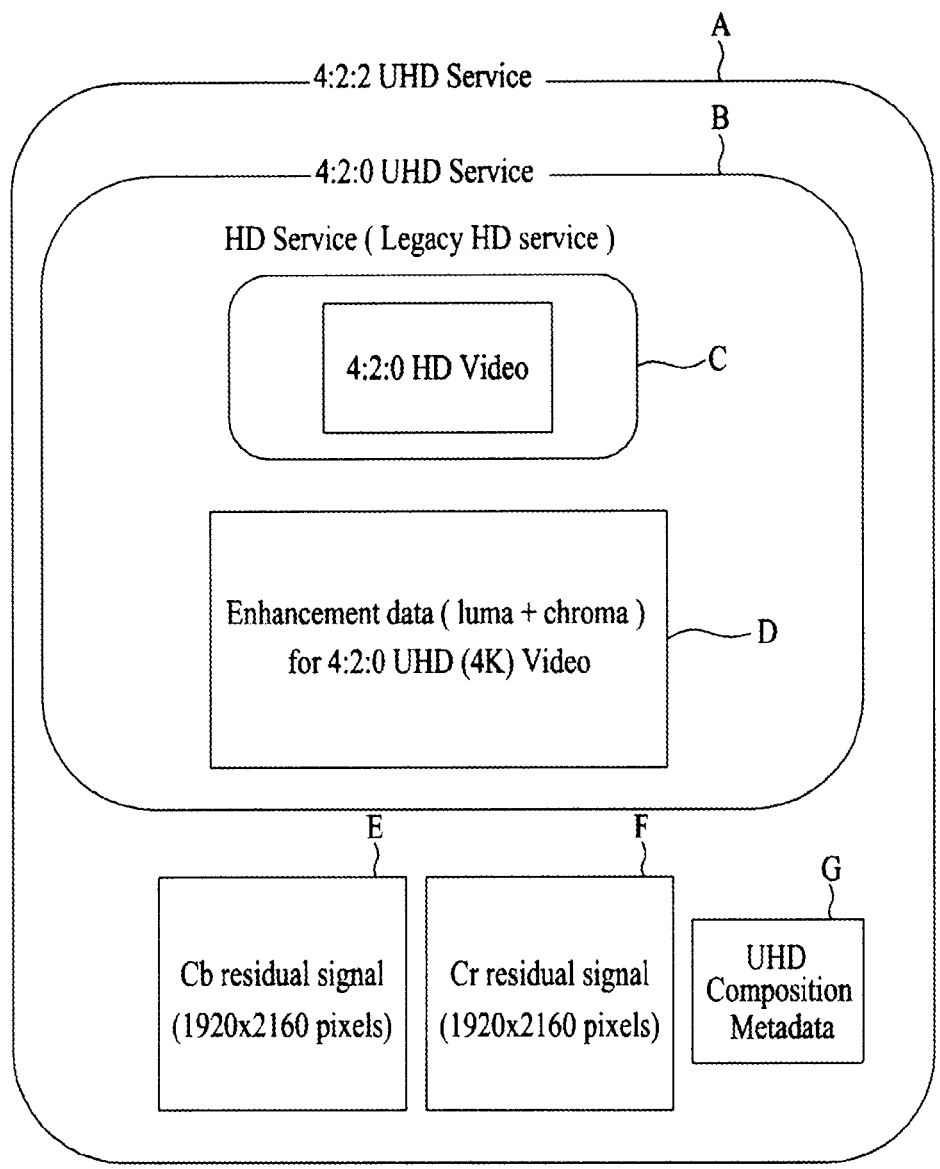
FIG. 7 is a diagram illustrating an example of a structure of a stream for providing 4:2:0 HD video and 4:2:2 UHD video.

Enhancement layer 2 data of a chroma signal is residual data r1 to r16 of a chroma component of high resolution video data. Accordingly, 4:2:2 sampling of high resolution video data (3840×2160) may be generated using the upscaled base layer data, enhancement layer 1 chroma data, and enhancement layer 2 chroma data. FIG. 7 is a diagram illustrating an example of a structure of a stream for providing 4:2:0 HD video and 4:2:2 UHD video.

A transport video stream A for providing a 4:2:2 sampling UHD video service may include a stream B, Cb residual data E, Cr residual data F, and metadata G as signaling data, for providing a 4:2:0 sampling UHD video service.

The stream B for providing a 4:2:0 sampling UHD video service may include 4:2:0 sampling HD video stream C and enhancement layer data D for 4:2:0 sampling 4K UHD video data, for providing an existing HD video service for a receiver that can receive and display an existing HD video.

A 4:2:0 UHD video service may be provided using the 4:2:0 sampling HD video stream C for providing an HD video service and residual data for composition of 4:2:0 sampling 4K UHD video In addition, when residual data of Cb/Cr is transmitted to the stream B for providing a 4:2:0 sampling UHD video service, a 4:2:2 UHD video service may be provided.

In this case, UHD composition metadata may include information about a chroma component corresponding to the current residual data and each resolution information item.

In this example, two chroma Cb and Cr residual data items are each residual data with a 1920×2160 pixel data size in order to provide a 4K UHD video.

FIG. 8 is a diagram illustrating a signal transmitting apparatus according to an embodiment of the present invention. In this example, 4:4:4 sampling UHD video data may be transmitted as enhancement layer 1 data including 4:2:0 sampling HD base layer data and 4:2:0 sampling UHD video data, and enhancement layer 2 data including residual data of a chroma component of 4:2:2 sampling UHD video.

The signal transmitting apparatus according to an embodiment of the present invention may include a first encoder 220 for encoding base layer data, a second encoder 230 for encoding enhancement layer 1 data, and a third encoder 240 for encoding enhancement layer 1 data.

4K UHD original video is assumed to be 4:4:4 sampling video A. Since resolution of the original video is 4K, the resolution may be 3840×2160 with respect to a Y signal, a Cb signal, and a Cr signal.

A first subsampler 210 may subsample a chroma signal in a horizontal direction. Thus, 4:2:2 sampling UHD video B is output. On the other hand, original video may be 4:2:2 UHD video. In this case, the first subsampler 210 is not included in the signal transmitting apparatus according to an embodiment of the present invention.

A first down-sampler 221 of the first encoder 220 may down-samples video B on which subsampling is performed to a video having 4:2:2 sampling HD resolution.

A signal converter 223 may convert a progressive method of video into an interlaced method of video. A converting method according to an embodiment of the present invention will be described in detail with reference to the drawings.

A second subsampler 225 may subsample a 4:2:2 sampling video in a vertical direction with respect to a chroma signal. Thus, a 4:2:0 sampling HD video C may be output, and HD video resolution may be 1920×1080 with respect to a signal of luminance Y and 960×540 with respect to chromas Cb and Cr. A first video encoder 227 may encode the 4:2:0 sampling HD video C to output base layer data. In this diagram, positions of the signal converter 223 and the second subsampler 225 may be exchanged.

The second encoder 230 may include a third subsampler 231, an upscaler 233, a first calculator 235, and a second video encoder 237 and encode video data to enhancement layer 1 data.

The third subsampler 231 subsamples a 4:2:2 sampling UHD video B in a vertical direction with respect to a chroma signal. Thus, a 4:2:0 sampling UHD video D may be output. For example, in the case of video with resolution of 4K, resolution of 4:2:0 sampling UHD video D may be 3840×2160 with respect to a luminance Y signal and 1920×1080 with respect to chroma Cb and Cr signals.

The upscaler 233 upscales and outputs the 4:2:0 sampling HD video C output from the first encoder 220 with a UHD video size, and the first calculator 235 subtracts the upscaled UHD video from the 4:2:0 sampling UHD video D to output residual data of UHD video. In addition, the second video encoder 237 may encode the residual data of the UHD video to output enhancement layer 1 data.

The third encoder 240 may include an upscaler 243, a second calculator 245, and a third video encoder 247.

The upscaler 243 may upscale a chroma signal of the 4:2:0 sampling UHD video D. The second calculator 245 outputs residual video data obtained by subtracting data formed by upscaling a chroma signal by the upscaler 243 from the 4:2:2 sampling UHD video B. The third video encoder 247 may encode the residual video data to output enhancement layer 2 data. In other words, the third encoder 240 encodes video data obtained by subtracting chroma upsampling data of the 4:2:0 sampling UHD video D from the 4:2:2 sampling UHD video B. According to the apparatus or a method thereof, a UHD video compatible with HD may be transmitted using chroma subsampling. In addition, in this example, a 4:2:2 UHD video is down-sampled, a progressive method is converted into an interlaced method, and a chroma component is subsampled. There are three cases for an order of the signal converter 223 and the second subsampler 225. The three cases will be described with reference to FIGS. 10, 11, and 12.

Figure 11:
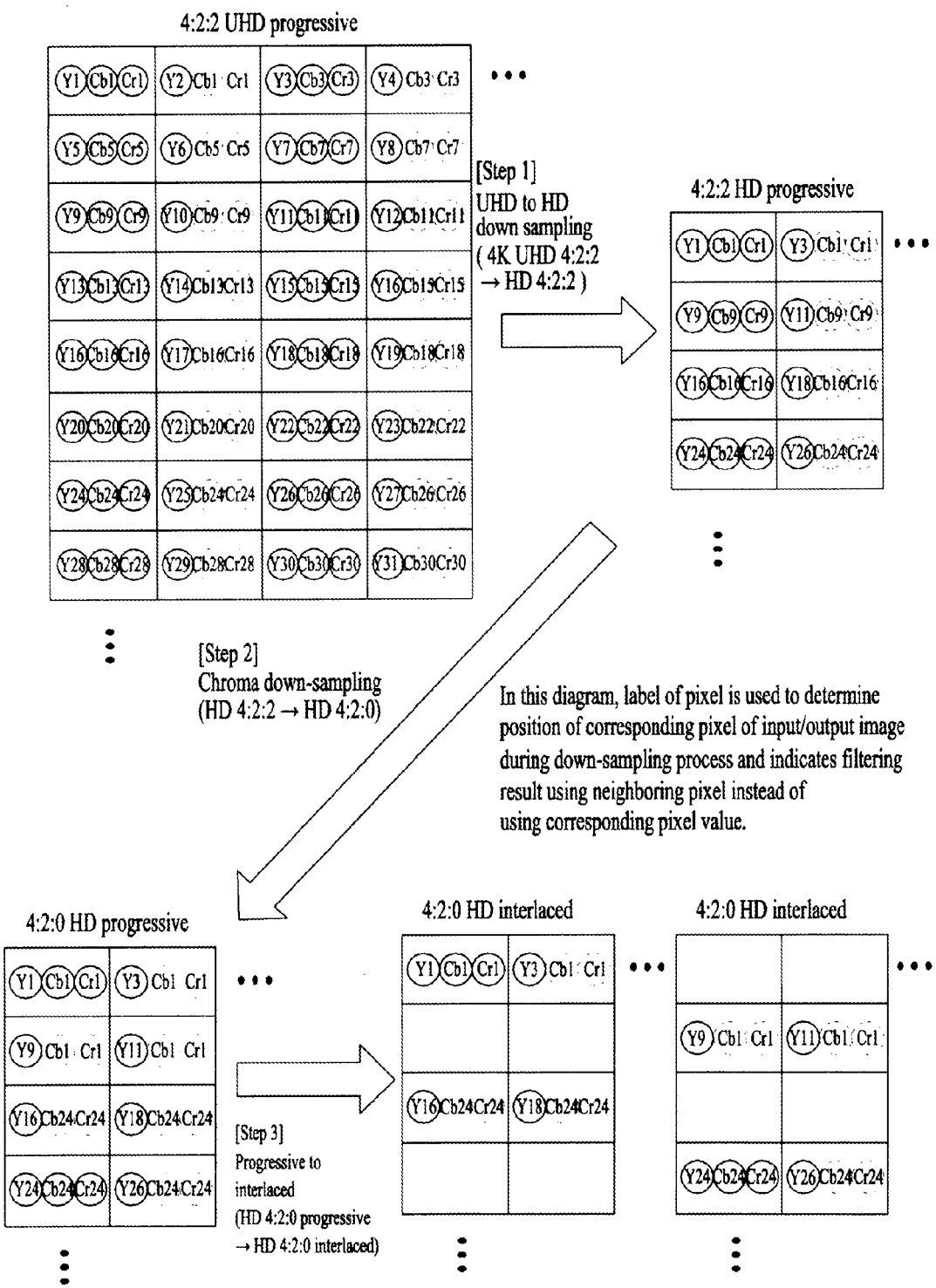
FIG. 11 is a diagram illustrating a first example of changing a high resolution video to low resolution video data with a compatible scanning method.

For example, FIG. 11 illustrates the case in which a 4:2:2 UHD progressive method of video data is converted into a 4:2:2 progressive method of HD data, is re-converted into a 4:2:0 progressive method of HD data, and then is converted into 4:2:0 HD interlaced method of video. In this example, the progressive method is converted into the interlaced method using chroma subsampling.

Figure 12:
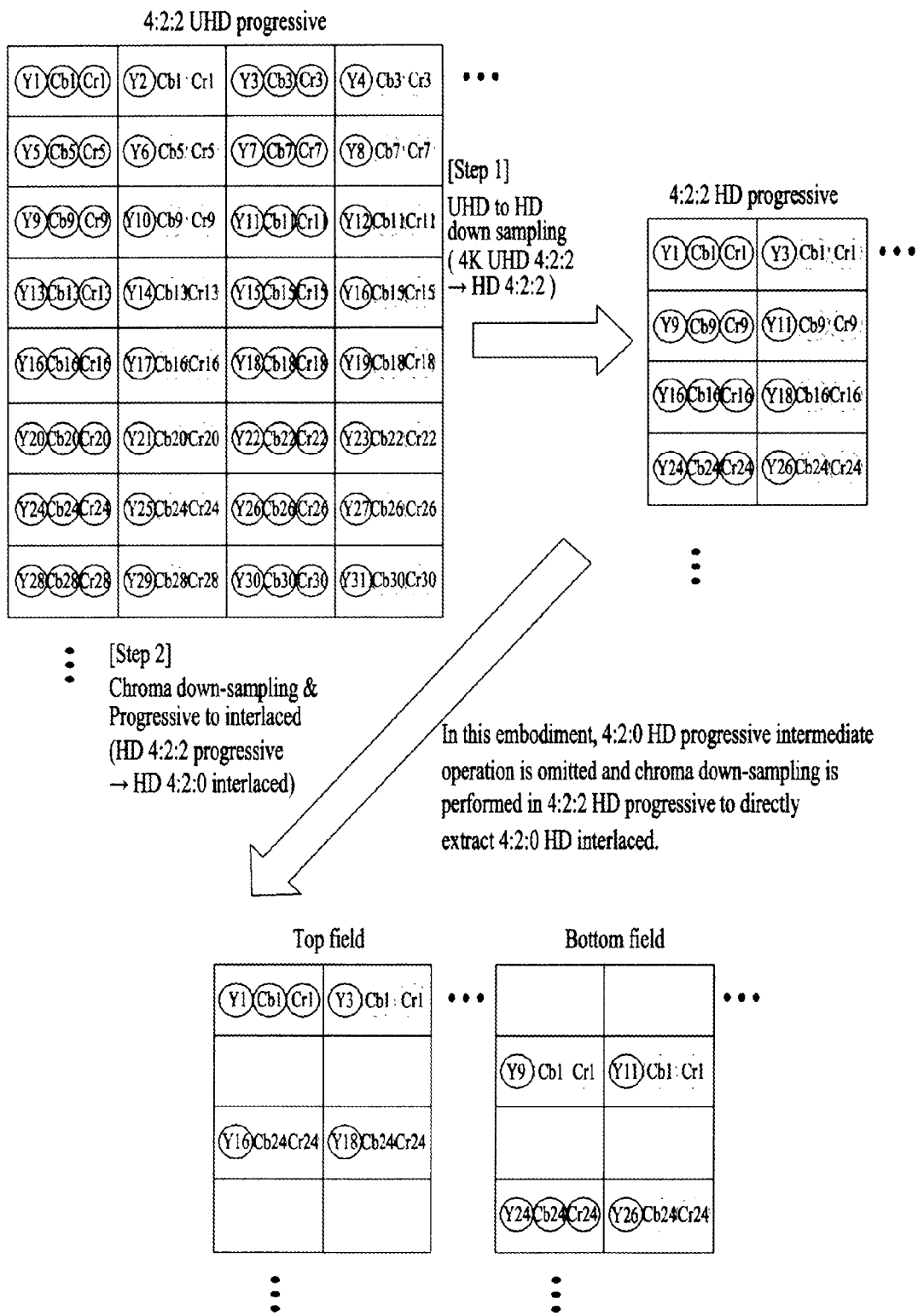
FIG. 12 is a diagram illustrating a second example of changing a high resolution video to low resolution video data with a compatible scanning method.

FIG. 12 illustrates the case in which a 4:2:2 UHD progressive method of video data is converted into a 4:2:2 progressive method of HD data and then is converted into a 4:2:0 HD interlaced method of video. In this example, chroma subsampling and conversion into an interlaced method are simultaneously performed.

FIG. 13 illustrates the case in which a 4:2:2 UHD progressive method of video data is converted into a 4:2:2 progressive method of HD data, is re-converted into a 4:2:2 progressive method of HD data, and then is converted into a 4:2:0 HD interlaced method of video. In this example, the progressive method is converted into an interlaced method and then video is converted using chroma subsampling.

FIG. 9 is a diagram of a signal transmitting apparatus according to another embodiment of the present invention. In this example, 4:4:4 sampling UHD video data may be transmitted as enhancement layer 1 data including 4:2:0 sampling HD base layer and 4:2:0 sampling UHD video, and enhancement layer 2 data including residual data of a chroma component of 4:2:2 sampling UHD video.

The signal transmitting apparatus according to another embodiment of the present invention a first encoder 320 for encoding base layer data, a second encoder 330 for encoding enhancement layer 1 data, and a third encoder 340 for encoding enhancement layer 1 data.

4K UHD original video is assumed to be 4:4:4 sampling video A. Since resolution of the original video is 4K, the resolution may be 3840×2160 with respect to a Y signal, a Cb signal, and a Cr signal.

A first subsampler 310 may subsample a chroma signal in a horizontal direction. Thus, the 4:2:2 sampling UHD video B is output. On the other hand, original video may be 4:2:2 UHD video. In this case, the first subsampler 310 is not included in the signal transmitting apparatus according to an embodiment of the present invention.

The second encoder 330 may include a subsampler 331, an upscaler 333, a first calculator 335, and a second video encoder 337.

A signal converter 321 of the first encoder 320 receives the 4:2:0 sampling UHD video D formed by subsampling the 4:2:2 sampling UHD video B in a vertical direction with respect to a chroma signal by the subsampler 331 of the second encoder 330. For example, in the case of video with resolution of 4K, resolution of 4:2:0 sampling UHD video D may be 3840×2160 with respect to a luminance Y signal and 1920×1080 with respect to chroma Cb and Cr signals.

The signal converter 321 may convert 4:2:0 sampling video into an HD interlaced method of video from a UHD progressive method to output the 4:2:0 sampling HD video C. When an original video has resolution of 4K, resolution of the HD video C may be 1920×1080 with respect to a luminance signal Y and 960×540 with respect to chroma signals Cb and Cr. A first video encoder 327 may encode the 4:2:0 sampling HD video C to output base layer data.

As described above, the second encoder 330 may include the subsampler 331, the upscaler 333, the first calculator 335, and the second video encoder 337 and encode video data to enhancement layer 1 data.

As described above, the subsampler 331 may subsample the 4:2:2 sampling UHD video B in a vertical direction with respect to a chroma signal to output the 4:2:0 sampling UHD video D.

The upscaler 333 upscales and outputs the 4:2:0 sampling HD video C output from the first encoder 320 with a UHD video size, and the first calculator 335 subtracts the upscaled UHD video from the 4:2:0 sampling UHD video D to output residual data of UHD video.

In addition, the second video encoder 337 may encode residual data of the UHD video to output enhancement layer 1 data.

The third encoder 340 may include an upscaler 343, a second calculator 345, and a third video encoder 347.

The upscaler 343 may upscale a chroma signal of the 4:2:0 sampling UHD video D.

The second calculator 345 outputs residual video data obtained by subtracting data upscaled by the upscaler 343 from the 4:2:2 sampling UHD video B.

The third video encoder 347 may encode the residual video data to output enhancement layer 2 data.

In other words, the third encoder 340 encodes video data obtained by subtracting upscampling data of the 4:2:0 sampling HD video C and residual data of enhancement layer 1 data from the 4:2:2 sampling UHD video B.

According to the apparatus or a method thereof, a UHD video compatible with HD may be transmitted using chroma subsampling. In addition, in this example, video data obtained by subsampling a chroma component of 4:2:2 UHD video into a 4:2:0 interlaced method of video data.

Hereinafter, the aforementioned example of converting a progressive method of video data into an interlaced method of video data will be described in detail.

FIG. 10 is a diagram illustrating an example of a scanning method according to video sampling.

This diagram illustrates a 4:2:2 progressive method of video (a), video with sample data positioned in a top field of a 4:2:0 interlaced method (b), and video with sample data positioned in a bottom field of a 4:2:0 interlaced method (c).

In the case of 4:2:0 interlaced format, a position of chroma subsampling may be varied for each field. When a video with sampling data positioned in a top field and a video with sampling data positioned in a bottom field are interleaved, the same format as 4:2:0 progressive may be obtained.

Accordingly, in consideration with compatibility with an existing 4:2:0 HD video, a compatibility method with interlaced format may also be applied to a high resolution video. In this regard, when a video system is embodied using a disclosed layer structure, UHD video data compatible with a scanning g method of HD video may be acquired.

For example, a first layer, a second layer, and a third layer may be used to transmit a 4:2:0 HD video, a 4:2:0 UHD video, and a 4:2:2 UHD video, respectively. Likewise, a service with three layers may be provided to simultaneously provide compatibility with respect to 4:2:0 UHD and 4:2:0 HD systems.

FIG. 11 is a diagram illustrating a first example of changing a high resolution video to low resolution video data with a compatible scanning method.

A 4:2:2 sampling progressive method of UHD video includes a pixel in which both a brightness signal and a chroma signal are positioned and pixels in which only a brightness signal is positioned. Here, the example will be described in terms of 8×4 pixels included in the video.

In a first operation, the 4:2:2 sampling progressive method of UHD video is converted into a 4:2:2 sampling progressive method of HD video through down-sampling. Here, 8×4 pixels included in the UHD video are down-sampled to 4×2 pixels.

In a second operation, a chroma component of a 4:2:2 sampling progressive method of HD video is down-sampled to be converted into a 4:2:0 sampling progressive method of HD video. In this diagram, pixel values indicated by labels denoting brightness and chroma components of each pixel are not maintained constant in a position of the corresponding pixel during the down-sampling process and indicate result pixel values of filtering with neighboring pixels.

In a third operation, a progressive method is converted into an interlaced method. That is, a 4:2:0 sampling progressive HD video is converted into a 4:2:0 sampling interlaced HD video. Thus, only brightness signals remain in a top field or a bottom field and the remaining signals do not express the corresponding pixels.

In the first example, a 4:2:2 progressive method of UHD video is convened into a 4:2:2 progressive method of HD video and re-converted into a 4:2:0 progressive method of HD video. In addition, a 4:2:0 progressive method of HD video may be converted into a 4:2:0 interlaced method of HD video.

FIG. 12 is a diagram illustrating a second example of changing a high resolution video to low resolution video data with a compatible scanning method.

Similarly, a 4:2:2 sampling progressive method of UHD video includes a pixel in which both a brightness signal and a chroma signal are positioned and pixels in which only a brightness signal is positioned. Here, the example will be described in terms of 8×4 pixels included in the video.

In a first operation, the 4:2:2 sampling progressive method of UHD video is converted into a 4:2:2 sampling progressive method of HD video through down-sampling. Here, 8×4 pixels included in the UHD video are down-sampled to 4×2 pixels.

In a second operation, a chroma component of a 4:2:2 sampling progressive method of HD video is down-sampled and simultaneously a progressive method is converted into an interlaced method. In this embodiment, a chroma component of a 4:2:2 sampling progressive HD video may be down-sampled to directly extract a 4:2:0 interlaced method of HD video. Thus, a 4:2:0 interlaced HD video may be obtained.

According to the second example, a 4:2:2 progressive method of UHD video is converted into a 4:2:2 progressive method of HD video. In addition, a 4:2:2 progressive method of HD video may be converted into a 4:2:0 interlaced method of HD video.

FIG. 13 is a diagram illustrating a third example of changing a high resolution video to low resolution video data with a compatible scanning method.

Similarly, a 4:2:2 sampling progressive method of UHD video includes a pixel in which both a brightness signal and a chroma signal are positioned and pixels in which only a brightness signal is positioned. Here, the example will be described in terms of 8×4 pixels included in the video.

In a first operation, the 4:2:2 sampling progressive method of UHD video is converted into a 4:2:2 sampling progressive method of HD video through down-sampling. Here, 8×4 pixels included in the UHD video are down-sampled to 4×2 pixels.

In a second operation, a chroma component of a 4:2:2 sampling progressive method of HD video is down-sampled. Thus, a 4:2:2 sampling interlaced method of HD video may be obtained.

In a third operation, a chroma component of a 4:2:2 sampling interlaced method of HD video may be down-sampled to obtain a 4:2:0 sampling interlaced method of HD video.

According to the third example, a 4:2:2 progressive method of UHD video is converted into a 4:2:2 progressive method of HD video. In addition, a 4:2:2 progressive method of HD video may be converted into a 4:2:2 interlaced method of HD video and re-converted into a 4:2:0 interlaced method of HD video.

According to the third example, a 4:2:2 sampling interlaced HD video is extracted to re-extract a 4:2:2 sampling interlaced HD video. Similarly, a label of a pixel refers to a corresponding position of a different format of video in each respective process and pixel values of respective pixels are not necessarily the same. For example, when a chroma component of a 4:2:0 sampling video is down-sampled, a chroma component value may be allocated in consideration of a coordinate when the videos are to be merged using a progressive method, but not in a field unit. For example, video data may be converted using a method of allocating different portions of chroma signals (e.g., Cb/Cr 24) using chroma signals Cb/Cr about a brightness signal (e.g., Y16) of a specific position.

Figure 14:
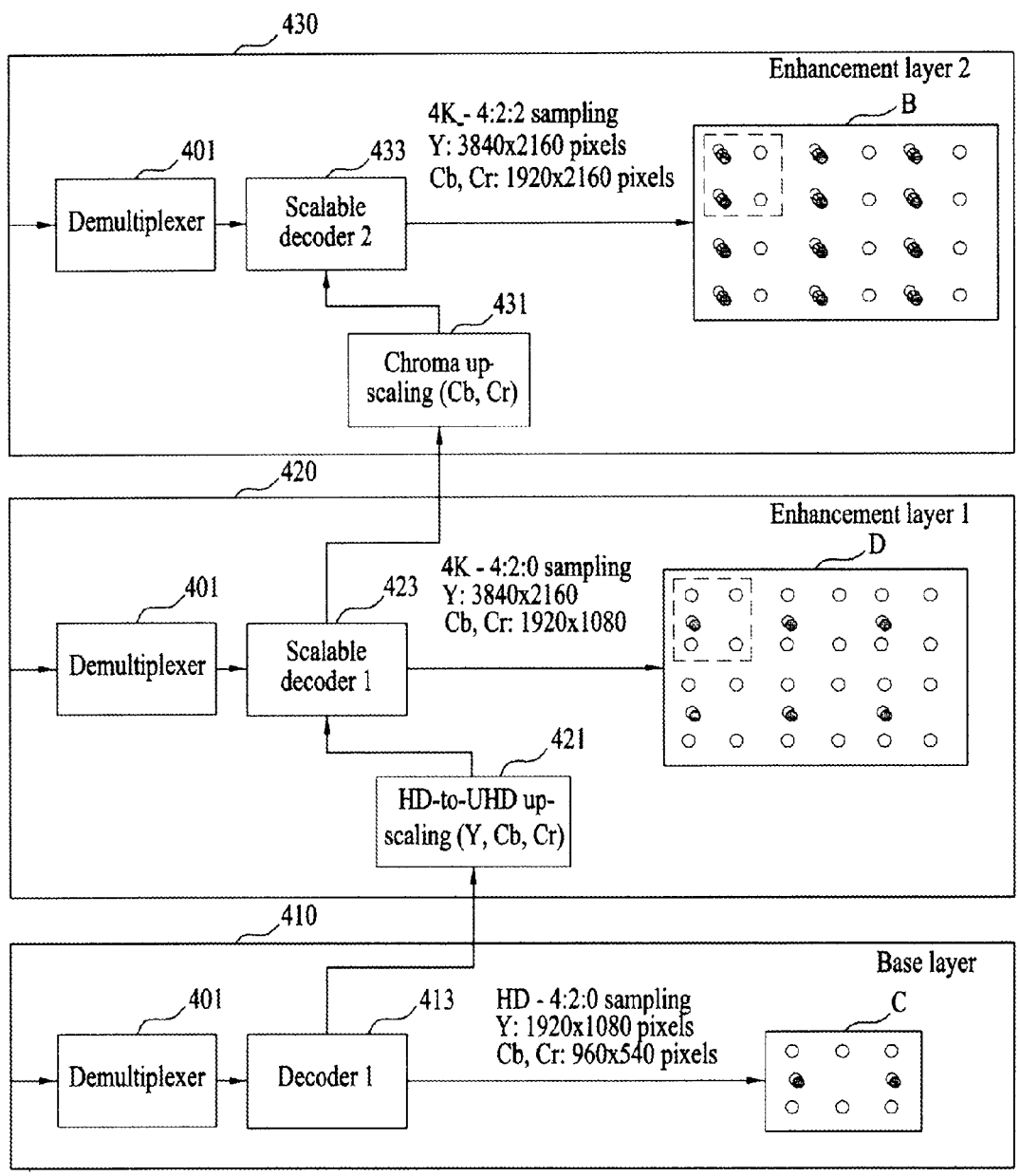
FIG. 14 is a decoder of a signal receiving apparatus according to an embodiment of the present invention.

FIG. 14 is a decoder of a signal receiving apparatus according to an embodiment of the present invention. Here, for convenience of description, high resolution video data is exemplified as 4K UHD video data. In this diagram, data items associated with a video are denoted by B, C, and D.

An example of the decoder for decoding video data may include at least one decoder of a base layer decoder 410, a first enhancement layer data decoder 420, and a second enhancement layer data decoder 430. For example, the decoder may include the base layer decoder 410, include the base layer decoder 410 and the first enhancement layer data decoder 420, or include all the first enhancement layer data decoder 420, and the second enhancement layer data decoder 430.

According to a function of the signal receiving apparatus, a decoder may include all decoders with three functions or a decoder of a signal receiving apparatus for outputting an existing HD video may include only the base layer decoder 410.

In this example, a demultiplexer 401 may be shared by the decoders and each decoder may include a separate demultiplexer 401.

A first decoder 413 of the base layer decoder 410 may decode base layer video data that is demultiplexed by the demultiplexer 401. According to the above example, the first decoder 413 may output the 4:2:0 sampling HD video C. Accordingly, when transmitted video data is 4K high resolution video data, the first decoder 413 may output video data of resolution with a brightness signal of 1920×1080 and a chroma signal of 960×540.

The HD receiving apparatus cannot recognize enhancement layer 1 and 2 data of a received video stream, and even if the HD receiving apparatus recognizes only the HD video of a base layer and accesses a UHD broadcast channel, the HD receiving apparatus may output only an HD broadcasting signal.

An upscaler 421 of the first enhancement layer data decoder 420E the first decoder 413 may upscale the decoded HD video to a UHD video. In addition, a second decoder 423 may perform scalable video decoding using the enhancement layer 1 data multiplexed by the demultiplexer 401 and the UHD video upscaled by the upscaler 421. In this case, the enhancement layer 1 data (residual data of 4:2:0 sampling UHD video) and the UHD video upscaled by the upscaler 421 may be merged.

The video data decoded by the second decoder 423 may be 4:2:0 sampling UHD video data D, and according to an example of 4K video, the second decoder 423 may output video data of resolution with a brightness signal of 3840×2160 and a chroma signal of 1920×1080.

For example, a signal receiving apparatus for supporting a 4:2:0 sampling type may output transmitted video data as UHD video using the base layer data and the enhancement layer 1 data.

An upscaler 431 of the second enhancement layer data decoder 430 may upscale and output a chroma component of the UHD video decoded by the second decoder 423. In addition, a third decoder 433 may perform scalable video decoding using the enhancement layer 2 data demultiplexed by the demultiplexer 401 and the UHD video upscaled by the upscaler 431. In this case, the enhancement layer 2 data (residual data of a chroma component of a 4:2:2 sampling UHD video) and the UHD video with a chroma component upscaled by the upscaler 431 may be merged. Since the chroma component of the UHD video is upscaled, the video data decoded by the third decoder 433 may be 4:2:2 sampling UHD video data B. Accordingly, according to an example of 4K video, the third decoder 433 may output video data of resolution with both brightness and chroma signals of 3840×2160.

Accordingly, when the signal receiving apparatus includes at least one decoder among the above decoders, at least one of an HD video and a UHD video may be decoded and output. A conventional HD video receiving apparatus may decode only base layer data of a received video stream using signaling information items, and a UHD video receiving apparatus may output a UHD video using the base layer data and the enhancement layer 1 data or output the UHD video using the base layer data, the enhancement layer 1 data, and the enhancement layer 2 data.

Hereinafter, according to the above embodiment of the present invention, signaling information of a broadcasting signal for signaling a video when the video is transmitted and received will be described.

FIG. 15 is a diagram illustrating signaling information for displaying a video according to an embodiment of the present invention. This diagram illustrating a PMT as signaling information in a system level. The signaling information may include a descriptor of a program level immediately after a field program_info_length of the PMT and a descriptor of a stream level immediately after a field ES_info_length.

This diagram illustrates UHD_program_type_descriptor as an example of the description of the program level.

descriptor_tag indicates an identifier of the descriptor and descriptor_length indicates a length of the descriptor.

In addition, as described above, UHD_program_format_type may indicate a type of a service including a video according to each scan type.

For example, when UHD_program_format_type is 0x05, the service includes a 4:2:0 sampling HD video, a 4:2:0 sampling UHD video, and a 4:2:2 sampling UHD video according to a scan type, and thus the signaling information may signal that a receiver for decoding any video format among these can receive and process a corresponding service.

In addition, as an example of a descriptor of a stream level, a UHD composition descriptor may be included in the PMT. The descriptor may include information about a base layer video element, information about an enhancement layer 1 video element, or information about an enhancement layer 2 video element.

FIG. 16 is a diagram illustrating a detailed syntax value of signaling information according to an embodiment of the present invention.

When signaling information of a broadcasting signal is a PMT, an exemplified field value may indicate the following information.

In a first embodiment, a stream for transmitting the first enhancement layer data and the second enhancement layer data is transmitted, but in this embodiment, all the data items may be signaled.

For example, Stream_type may be a value such as 0x02 or the like indicating a video stream according to an MPEG-2 video codec.

Elementary_PID indicates a PID value of an elementary stream included in each program, and for example, is a value of 0x109A. A descriptor of a stream level may include signaling information associated with an MPEG-2 video.

With regard to a stream for transmitting enhancement layer 1 video data, the PMT may include the following information.

Stream_type may be a type value (here, e.g., 0xA1) indicating a stream type according to a HEVC scalable layer video codec.

Elementary_PID indicates a PID value of an elementary stream included in each program, and for example, is a value of 0x109B.

UHDTV_sub_stream_descriptor( ) as a descriptor of a stream level may include information required to composite a 4:2:0 UHD video using enhancement layer 1 video data and base layer data.

With regard to a stream for transmitting enhancement layer 2 video data, the PMT may include the following information.

Stream_type may be a type value (here, e.g., 0xA2) indicating a stream type according to a HEVC scalable layer video code.

Elementary_PID indicates a PID value of an elementary stream included in each program, and for example, is a value of 0x109C.

UHDTV_composition_descriptor( ) as a descriptor of a stream level may include information associated with enhancement layer 2 data and information required to restore a 4:2:2 UHD video.

Figure 17:
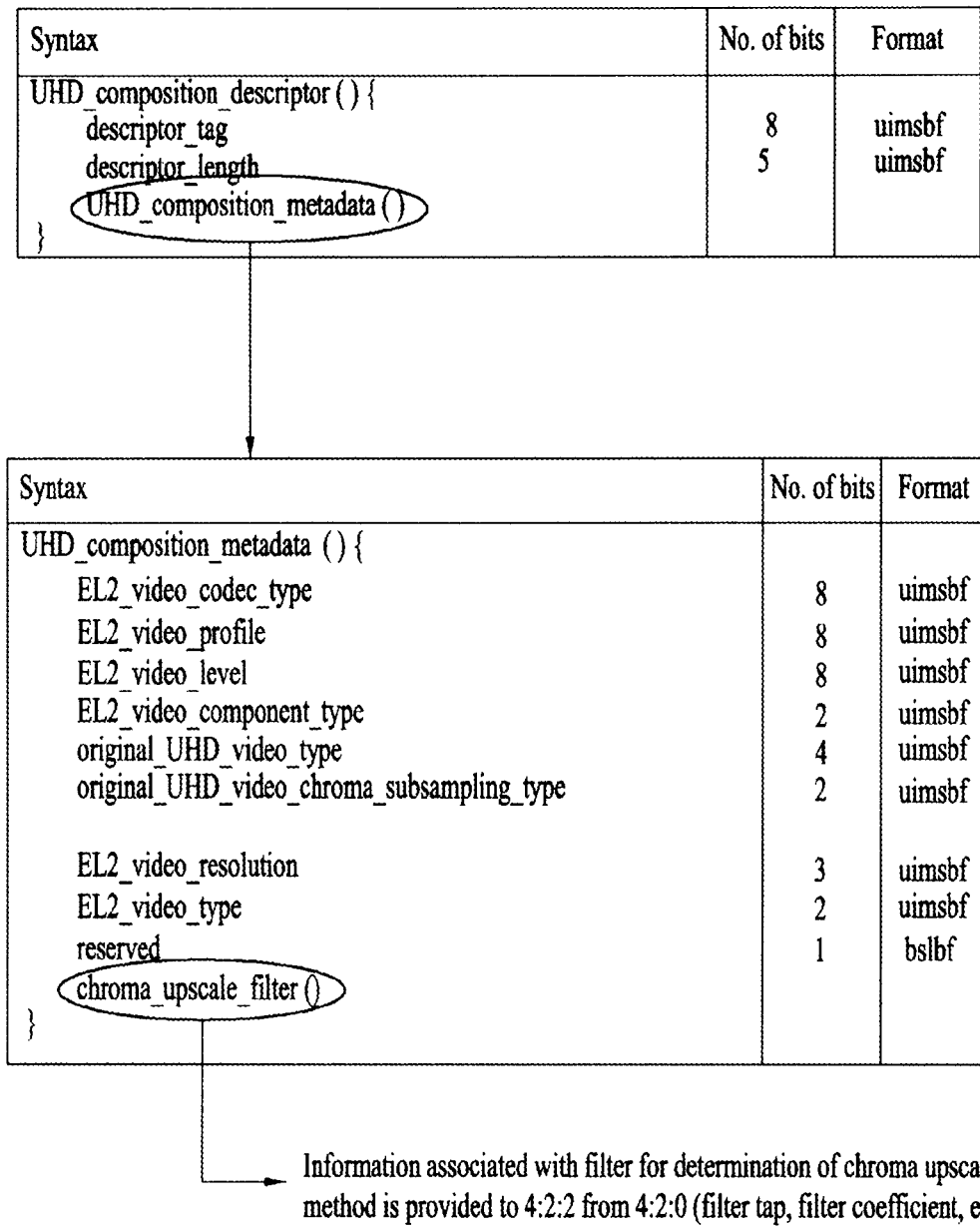
FIG. 17 illustrates an example of a stream level descriptor according to an embodiment of the present invention.

FIG. 17 illustrates an example of a stream level descriptor according to an embodiment of the present invention.

The stream level descriptor may include a descriptor_tag value for identification of the descriptor and descriptor_length and UHD_composition_metadata( ) indicating a length of the descriptor.

In this example, information included in UHD_composition_metadata( ) will be exemplified below.

A field EL2_video_codec type indicates codec information of a video element included in a UHD service. For example, this value may be the same as stream_type of the PMT.

A field EL2_video_profile may indicate profile information about a corresponding video stream, that is, information about basic specifications required to decode the corresponding stream. The field EL2_video_profile may include information about requirement for color depth (4:2:0, 4:2:2, etc.), bit depth (8-bit, 10-bit), coding tool, etc. of the corresponding video stream.

A field EL2_video_level may indicate level information of a corresponding video stream and include information about a supporting range of technology elements defined in the profile.

A field EL2_video_component_type indicates data included in a corresponding video stream when the corresponding video stream configures a UHD service. For example, the field EL2_video_component_type indicates whether the stream transmits base layer data corresponding to a 4:2:0 sampling HD video, enhancement layer 1 data as residual data included in 4:2:0 sampling UHD video, or enhancement layer 2 data included in a 4:2:2 sampling UHD video.

A field original_UHD_video_type may signal information about UHD video format and indicate basic information such as resolution, frame rate, and so on of a video, which will be described later in detail.

original_UHD_video_chroma_subsampling_type indicates information about chroma subsampling format of an original UHD video, which will be described later.

A field EL2_video_resolution indicates resolution information about added residual data, which will be described later.

A field EL2_video_type indicates information about a component of a signal transmitted in an enhancement layer, which will be described later.

A field chroma_upscale_filter indicates information associated with a filter when a chroma component is upscaled to a second scan type from a first scan type. For example, the field chroma_upscale_filter provides information associated with a filter for determination of a chroma upscaling method to a 4:2:2 scan type from a 4:2:0 scan type.

The information associated with the filter may include filter tap information, filter coefficient information, or the like.

FIG. 18 is a diagram illustrating a value of information indicating a resolution and frame rate of the aforementioned video. A field original_UHD_video_type of signaling information may indicate the resolution and frame rate of the video. This diagram illustrates that the video can have various resolutions and frame rates according to the value. For example, when a field original_UHD_video_type has 0101, an original video may have 60 frames per second and resolution of 4096×2160.

FIG. 19 is a diagram illustrating information about chroma subsampling format of an original UHD video. A field original_UHD_video_chroma_subsampling_type of the aforementioned signaling information indicates information about chroma subsampling format of the original UHD video. This diagram illustrates the case in which subsampling format of a brightness signal and a chroma signal is 4:4:4 (Y:Cb:Cr) when the value is 10, for example.

FIG. 20 illustrates resolution information about residual data of video data. A field EL2_video_resolution of the aforementioned signaling information indicates resolution information about added residual data. For example, when the field EL2 video resolution is 010, the field EL2 video resolution indicates that resolution of residual data of a high resolution chroma component as enhancement layer 2 data included in the video is 1920×2160.

FIG. 21 illustrates information about a signal transmitted in an enhancement layer. A field EL2_video_type of the aforementioned signaling information indicates information about a component of a signal transmitted in an enhancement layer. For example, when the field EL2_video_type is 01, a signal component of enhancement layer 2 data included in the video is a Cb signal.

FIG. 22 illustrates the case in which the aforementioned descriptors are included in other signaling information. This diagram illustrates the case in which the aforementioned descriptors are included in a SDT.

A field table_id indicates an identifier of a table.

A field section_syntax_indicator is a 1-bit field set to 1 with respect to a SDT table section (section_syntax_indicator: The section_syntax_indicator is a 1-bit field which shall be set to "1").

A field section_length indicates a length of a section as a byte number (section_length: This is a 12-bit field, the first two bits of which shall be "00". It specifies the number of bytes of the section, starting immediately following the section_length field and including the CRC. The section_length shall not exceed 1 021 so that the entire section has a maximum length of 1 024 bytes.).

A field transport_stream_id indicates a TS identifier provided by the SDT differently from another multiplexer in a transmission system (transport_stream_id: This is a 16-bit field which serves as a label for identification of the TS, about which the SDT informs, from any other multiplex within the delivery system.).

A field version_number indicates a version number of the sub table (version_number: This 5-bit field is the version number of the sub_table. The version_number shall be incremented by 1 when a change in the information carried within the sub_table occurs. When it reaches value "31", it wraps around to "0". When the current_next_indicator is set to "1", then the version_number shall be that of the currently applicable sub_table. When the current_next_indicator is set to "0", then the version_number shall be that of the next applicable sub_table.).

A field current_next_indicator indicates whether the sub table can be currently applied or can be applied in the future (current_next_indicator: This 1-bit indicator, when set to "1" indicates that the sub_table is the currently applicable sub_table. When the bit is set to "0", it indicates that the sub_table sent is not yet applicable and shall be the next sub_table to be valid.).

A field section_number indicates a number of a section (section_number: This 8-bit field gives the number of the section. The section_number of the first section in the sub_table shall be "0x00". The section_number shall be incremented by 1 with each additional section with the same table_id, transport_stream_id, and original_network_id.).

A field last_section_number indicates a number of a last section (last_section_number: This 8-bit field specifies the number of the last section (that is, the section with the highest section_number) of the sub_table of which this section is part.).

A field original_network_id indicates an identifier of a network ID of a transmission system (original_network_id: This 16-bit field gives the label identifying the network_id of the originating delivery system.).

A field service_id indicates a service identifier in a TS (service_id: This is a 16-bit field which serves as a label to identify this service from any other service within the TS. The service_id is the same as the program_number in the corresponding program_map_section.).

A field EIT_schedule_flag may indicate whether EIT schedule information about a service is present in a current TS (EIT_schedule_flag: This is a 1-bit field which when set to "1" indicates that EIT schedule information for the service is present in the current TS, see TR 101 211 [i.2] for information on maximum time interval between occurrences of an EIT schedule sub_table). If the flag is set to 0 then the EIT schedule information for the service should not be present in the TS.).

A field EIT_present_following_flag may indicate whether EIT_present_following information about a service is present in a current TS (ET_present_following_flag: This is a 1-bit field which when set to "I" indicates that EIT_present_following information for the service is present in the current TS, see TR 101 211 [i.2] for information on maximum time interval between occurrences of an EIT present/following sub_table. If the flag is set to 0 then the EIT present/following information for the service should not be present in the TS.).

A field running_status may indicate a state of a service defined in table 6 of DVB-SI document (running_status: This is a 3-bit field indicating the status of the service as defined in table 6. For an NVOD reference service the value of the running_status shall be set to "0".).

A field free_CA_mode indicates whether all component streams of a service are scrambled (free_CA_mode: This 1-bit field, when set to "0" indicates that all the component streams of the service are not scrambled. When set to "1" it indicates that access to one or more streams may be controlled by a CA system.).

A field descriptors_loop_length indicates a length of a following descriptor (descriptors_loop_length: This 12-bit field gives the total length in bytes of the following descriptors).

CRC_32 is a 32-bit field including a CRC value (CRC_32: This is a 32-bit field that contains the CRC value that gives a zero output of the registers in the decoder).

A field descriptors_loop_length may include UHD_program_type_descriptor illustrated in FIG. 15 and UHD_composition_descriptor illustrated in FIG. 17 at a position of the following description.

When an SDT of a DVB includes UHD_composition_descriptor, the UHD_component_descriptor may further include a field component_tag. The field component_tag may indicate a PID value about a corresponding stream signaled in a PMT as a PSI level. A receiver may search for the PID value of the corresponding stream together with the PMT using the field component_tag.

FIG. 23 illustrates the case in which the aforementioned descriptors are included in other signaling information. This diagram illustrates the case in which the aforementioned descriptors are included in an EIT.

The EIT may comply with ETSI EN 300 468. Each field will be described below using this.

table_id: this indicates a table identifier.

A field section_syntax_indicator is a 1-bit field set to 1 with respect to an EIT table section (section_syntax_indicator: The section_syntax_indicator is a 1-bit field which shall be set to "1".).

A field section_length indicates a length of a section as a byte number (section_length: This is a 12-bit field. It specifies the number of bytes of the section, starting immediately following the section_length field and including the CRC.

The section_length shall not exceed 4 093 so that the entire section has a maximum length of 4 096 bytes.).

A field service_id indicates a service identifier in a TS (service_id: This is a 16-bit field which serves as a label to identify this service from any other service within a TS. The service_id is the same as the program_number in the corresponding program_map_section.).

A field version_number indicate a version number of the sub table (version_number: This 5-bit field is the version number of the sub_table. The version_number shall be incremented by 1 when a change in the information carried within the sub_table occurs. When it reaches value 31, it wraps around to 0. When the current_next_indicator is set to "1", then the version_number shall be that of the currently applicable sub_table. When the current_next_indicator is set to "0", then the version_number shall be that of the next applicable sub_table.).

A field current_next_indicator indicates whether the sub table can be currently applied or can be applied in the future (current_next_indicator: This 1-bit indicator, when set to "1" indicates that the sub_table is the currently applicable sub_table. When the bit is set to "0", it indicates that the sub_table sent is not yet applicable and shall be the next sub_table to be valid.).

A field section_number indicates a number of a section (section_number: This 8-bit field gives the number of the section. The section_number of the first section in the sub_table shall be "0x00". The section_number shall be incremented by 1 with each additional section with the same table_id, service_id, transport_stream_id, and original_network_id. In this case, the sub_table may be structured as a number of segments. Within each segment the section_number shall increment by 1 with each additional section, but a gap in numbering is permitted between the last section of a segment and the first section of the adjacent segment.).

A field last_section_number indicates a number of a last section (last_section_number: This 8-bit field specifies the number of the last section (that is, the section with the highest section_number) of the sub_table of which this section is part.).

A field transport_stream_id indicates a TS identifier provided by the SDT differently from another multiplexer in a transmission system (transport_stream_id: This is a 16-bit field which serves as a label for identification of the TS, about which the EIT informs, from any other multiplex within the delivery system.).

A field original_network_id indicates an identifier of a network ID of a transmission system (original_network_id: This 16-bit field gives the label identifying the network_id of the originating delivery system.).

A field segment_last_section_number indicates a last section number of the segment of the sub table (segment_last_section_number: This 8-bit field specifies the number of the last section of this segment of the sub_table. For sub_tables which are not segmented, this field shall be set to the same value as the last_section_number field.).

A field last_table_id (last_table_id: This 8-bit field identifies the last table_id used (see table 2).)

A field event_id indicates an identification number of an event (event_id: This 16-bit field contains the identification number of the described event (uniquely allocated within a service definition).

A field start_time includes start time of an event (start_time: This 40-bit field contains the start time of the event in Universal Time, Co-ordinated (UTC) and Modified Julian Date (MJD) (see annex C). This field is coded as 16 bits giving the 16 LSBs of MJD followed by 24 bits coded as 6 digits in 4-bit Binary Coded Decimal (BCD). If the start time is undefined (e.g. for an event in a NVOD reference service) all bits of the field are set to "l".).

A field running_status indicates a status of an event defined in table 6 of DVB SI document ((running_status: This is a 3-bit field indicating the status of the event as defined in table 6. For an NVOD reference event the value of the running_status shall be set to "0".).

A field free_CA_mode indicates whether all component streams of a service are scrambled (free_CA_mode: This 1-bit field, when set to "0" indicates that all the component streams of the event are not scrambled. When set to "1" it indicates that access to one or more streams is controlled by a CA system.).

A field descriptors_loop_length indicates a length of a following descriptor (descriptors_loop_length: This 12-bit field gives the total length in bytes of the following descriptors.).

CRC_32 is a 32-bit field including a CRC value (CRC_32: This is a 32-bit field that contains the CRC value that gives a zero output of the registers in the decoder).

A field descriptors_loop_length may include UHD_program_type_descriptor illustrated in FIG. 15 and UHD_composition_descriptor illustrated in FIG. 17 at a position of the following description.

When an EIT of a DVB includes UHD_composition_descriptor, the UHD_composition_descriptor may further include a field component_tag. The field component_tag may indicate the PTD value of the corresponding stream signaled by the PMI as a PSI level. A receiver may search for the PID value of the corresponding stream together with the PMT using the field component_tag.

FIG. 24 is illustrates the case in which the aforementioned descriptors are included in other signaling information. This diagram illustrates the case in which the aforementioned descriptors are included in a VCT.

The VCT may comply with ATSC PSIP standard. According to the ATSC PSIP, each field will be described below. Each bit will be described as follows.

A field table_id indicates a 8-bit unsigned integer indicating a type of a table section (table_id—An 8-bit unsigned integer number that indicates the type of table section being defined here. For the terrestrial_virtual_channel_table_section( ), the table_id shall be 0xC8).

A field section_syntax_indicator is a 1-bit field set to 1 with respect to a VCT table section (section_syntax_indicator—The section_syntax_indicator is a one-bit field which shall be set to '1' for the terrestrial_virtual_channel_table_section( )).

A field private_indicator is set to 1 (private_indicator—This 1-bit field shall be set to '1').

A field section_length indicates a length of a section as a byte number (section_length—This is a twelve bit field, the first two bits of which shall be '00'. It specifies the number of bytes of the section, starting immediately following the section_length field, and including the CRC.).

A field transport_stream_id indicates MPEG-TS ID like in a PAT for identification of a TVCT (transport_stream_id—The 16-bit MPEG-2 Transport Stream ID, as it appears in the Program Association Table (PAT) identified by a PID value of zero for this multiplex. The transport_stream_id distinguishes this Terrestrial Virtual Channel Table from others that may be broadcast in different PTCs.).

A field version_number indicates a version number of a VCT (version_number—This 5 bit field is the version number of the Virtual Channel Table. For the current VCT (current_next_indicator='1'), the version number shall be incremented by 1 whenever the definition of the current VCT changes. Upon reaching the value 31, it wraps around to 0. For the next VCT (current_next_indicator='0'), the version number shall be one unit more than that of the current VCT (also in modulo 32 arithmetic). In any case, the value of the version_number shall be identical to that of the corresponding entries in the MGT).

A field current_next_indicator indicates whether the VCT table can be currently applied or can be applied in the future (current_next_indicator—A one-bit indicator, which when set to '1' indicates that the Virtual Channel Table sent is currently applicable. When the bit is set to '0', it indicates that the table sent is not yet applicable and shall be the next table to become valid. This standard imposes no requirement that "next" tables (those with current_next_indicator set to '0') must be sent. An update to the currently applicable table shall be signaled by incrementing the version_number field).

A field section_number indicates a number of a section (section_number—This 8 bit field gives the number of this section. The section_number of the first section in the Terrestrial Virtual Channel Table shall be 0x00. It shall be incremented by one with each additional section in the Terrestrial Virtual Channel Table).

A field last_section_number indicates a number of a last section (last_section_number—This 8 bit field specifies the number of the last section (that is, the section with the highest section_number) of the complete Terrestrial Virtual Channel Table.).

A field protocol_version indicates a protocol version for a parameter to be defined in the future differently from a current protocol (protocol_version—An 8-bit unsigned integer field whose function is to allow, in the future, this table type to carry parameters that may be structured differently than those defined in the current protocol. At present, the only valid value for protocol_version is zero. Non-zero values of protocol_version may be used by a future version of this standard to indicate structurally different tables).

A field num_channels_in_section indicates a number of virtual channels of the VCT (num_channels_in_section—This 8 bit field specifies the number of virtual channels in this VCT section. The number is limited by the section length).

A field short_name indicates a name of a virtual channel (short_name—The name of the virtual channel, represented as a sequence of one to seven 16-bit code values interpreted in accordance with the UTF-16 representation of Unicode character data. If the length of the name requires fewer than seven 16-bit code values, this field shall be padded out to seven 16-bit code values using the Unicode NUL character (0x0000). Unicode character data shall conform to The Unicode Standard, Version 3.0 [13].).

A field major_channel_number indicates a number of major channels associated with a virtual channel (major_channel_number—A 10-bit number that represents the "major" channel number associated with the virtual channel being defined in this iteration of the "for" loop. Each virtual channel shall be associated with a major and a minor channel number. The major channel number, along with the minor channel number, act as the user's reference number for the virtual channel. The major_channel_number shall be between 1 and 99. The value of major_channel_number shall be set such that in no case is a major_channel_number/minor_channel_number pair duplicated within the TVCT. For major_channel_number assignments in the U.S., refer to Annex B.).

A field minor_channel_number indicates a number of minor channels associated with a virtual channel (minor_channel_number—A 10-bit number in the range 0 to 999 that represents the "minor" or "sub"-channel number. This field, together with major_channel_number, performs as a two-part channel number, where minor_channel_number represents the second or right-hand part of the number. When the service_type is analog television, minor_channel_number shall be set to 0. Services whose service_type is ATSC_digital_television, ATSC_audio_only, or unassociated/small screen service shall use minor numbers between 1 and 99. The value of minor_channel_number shall be set such that in no case is a major_channel_number/minor_channel_number pair duplicated within the TVCT. For other types of services, such as data broadcasting, valid minor virtual channel numbers are between 1 and 999.).

A mode modulation_mode indicates a modulation mode associated with a virtual channel (modulation_mode—An 8-bit unsigned integer number that indicates the modulation mode for the transmitted carrier associated with this virtual channel. Values of modulation_mode shall be as defined in Table 6.5. For digital signals, the standard values for modulation mode (values below 0x80) indicate transport framing structure, channel coding, interleaving, channel modulation, forward error correction, symbol rate, and other transmission-related parameters, by means of a reference to an appropriate standard. The modulation_mode field shall be disregarded for inactive channels).

A field carrier_frequency is a field for identification of a carrier frequency (carrier_frequency—The recommended value for these 32 bits is zero. Use of this field to identify carrier frequency is allowed, but is deprecated.).

A field channel_TSID indicates an MPEG-2 TS ID associated with a TS for transmission of an MPEG-2 program referenced by the virtual channel (channel_TSID—A 16-bit unsigned integer field in the range 0x0000 to 0xFFFF that represents the MPEG-2 Transport Stream ID associated with the Transport Stream carrying the MPEG-2 program referenced by this virtual channelS. For inactive channels, channel_TSID shall represent the ID of the Transport Stream that will carry the service when it becomes active. The receiver is expected to use the channel_TSID to verify that any received Transport Stream is actually the desired multiplex. For analog channels (service_type 0x01), channel_TSID shall indicate the value of the analog TSID included in the VBI of the NTSC signal. Refer to Annex D Section 9 for a discussion on use of the analog TSID).

A field program_number indicates an integer number defined in conjunction with the virtual channel (program_number—A 16-bit unsigned integer number that associates the virtual channel being defined here with the MPEG-2 PROGRAM ASSOCIATION and TS PROGRAM MAP tables. For virtual channels representing analog services, a value of 0xFFFF shall be specified for program_number. For inactive channels (those not currently present in the Transport Stream), program_number shall be set to zero. This number shall not be interpreted as pointing to a Program Map Table entry.).

A field ETM_location indicates the presence and position of an ETM (ETM_location—This 2-bit field specifies the existence and the location of an Extended Text Message (ETM) and shall be as defined in Table 6.6.).

A field access_controlled may indicate an event associated with an access-controlled virtual channel (access_controlled—A 1-bit Boolean flag that indicates, when set, that the events associated with this virtual channel may be access controlled. When the flag is set to '0', event access is not restricted).

A hidden field may indicate the case in which the virtual channel is not accessed by direct channel input of a user (hidden—A 1-bit Boolean flag that indicates, when set, that the virtual channel is not accessed by the user by direct entry of the virtual channel number. Hidden virtual channels are skipped when the user is channel surfing, and appear as if undefined, if accessed by direct channel entry. Typical applications for hidden channels are test signals and NVOD services. Whether a hidden channel and its events may appear in EPG displays depends on the state of the hide_guide bit.).

A field hide_guide may indicate whether a virtual channel and an event thereof can be indicated in an EPG (hide_guide—A Boolean flag that indicates, when set to '0' for a hidden channel, that the virtual channel and its events may appear in EPG displays. This bit shall be ignored for channels which do not have the hidden bit set, so that non-hidden channels and their events may always be included in EPG displays regardless of the state of the hide_guide bit. Typical applications for hidden channels with the hide_guide bit set to '1' are test signals and services accessible through application-level pointers.).

A field service_type indicates a service type identifier (service_type—This 6-bit field shall carry the Service Type identifier. Service Type and the associated service_type field are defined in A/53 Part 1 [1] to identify the type of service carried in this virtual channel. Value 0x00 shall be reserved. Value 0x01 shall represent analog television programming. Other values are defined in A/53 Part 3 [3], and other ATSC Standards may define other Service Types9).

A field source_id is an identification number for identifying a program source associated with a virtual channel (source_id—A 16-bit unsigned integer number that identifies the programming source associated with the virtual channel. In this context, a source is one specific source of video, text, data, or audio programming. Source ID value zero is reserved. Source ID values in the range 0x0001 to 0x0FFF shall be unique within the Transport Stream that carries the VCT, while values 0x1000 to 0xFFFF shall be unique at the regional level. Values for source_ids 0x1000 and above shall be issued and administered by a Registration Authority designated by the ATSC.).

A field descriptors_length indicates a length of a following descriptor (descriptors_length—Total length (in bytes) of the descriptors for this virtual channel that follows).

descriptor( ) may include a descriptor (descriptor( )—Zero or more descriptors, as appropriate, may be included.).

According to embodiments of the present invention, when a video service is transmitted, a field service_type may have a field value indicating a parameterized service (0x07), an extended parameterized service (0x09), or a scalable UHDTV service.

In addition. UHD_program_type_descriptor illustrated in FIG. 15 and UHD_composition_descriptor illustrated in FIG. 17 may be positioned at a position of a descriptor.

Then, according to an embodiment of the present invention, when video data is transmitted, syntax of the video data is disclosed.

FIG. 25 illustrates syntax of a payload of an SEI region of video data according to an embodiment of the present invention.

When payloadType in the SEI payload is set to a specific value (52 in this example), the payloadType may include information for signaling format of video data (UHD_scalable_chroma_serivce_info(payloadSize)) as illustrated in the diagram. In particular, the signing information indicates signaling information associated with scalable coded-chroma component.

An embodiment of parsing video data according to the aforementioned syntax by a decoder of a receiver will be described as follows.

Upon decoding video data, the decoder parses an AVC or HEVC NAL unit from a video element stream. In addition, a value of nal_unit_type may correspond to SEI data, and when payloadType of the SEI data is 52, information according to syntax of the aforementioned UHDTV_scalable_chroma_service_info SEI message may be obtained.

As illustrated in FIG. 14, the syntax of the aforementioned SET payload may indicate program format type information UHD_program_format_type indicating that video data is transmitted in a plurality of layers according to sampling information. In addition, the syntax of the SEI payload may include information about scalable chroma subsampling with respect to a current video stream. For example, video data may include video composition metadata information (UHD_composition_metadata) including sampling information of video data illustrated in FIG. 17. A receiver may determine whether a video to be decoded is 4:2:0 HD video data, 4:2:0 UHD video data, or 4:2:2 UHD video data, using the information. Based on this information, the receiver may output a UHD or HD video according to performance of the receiver.

Figure 26:
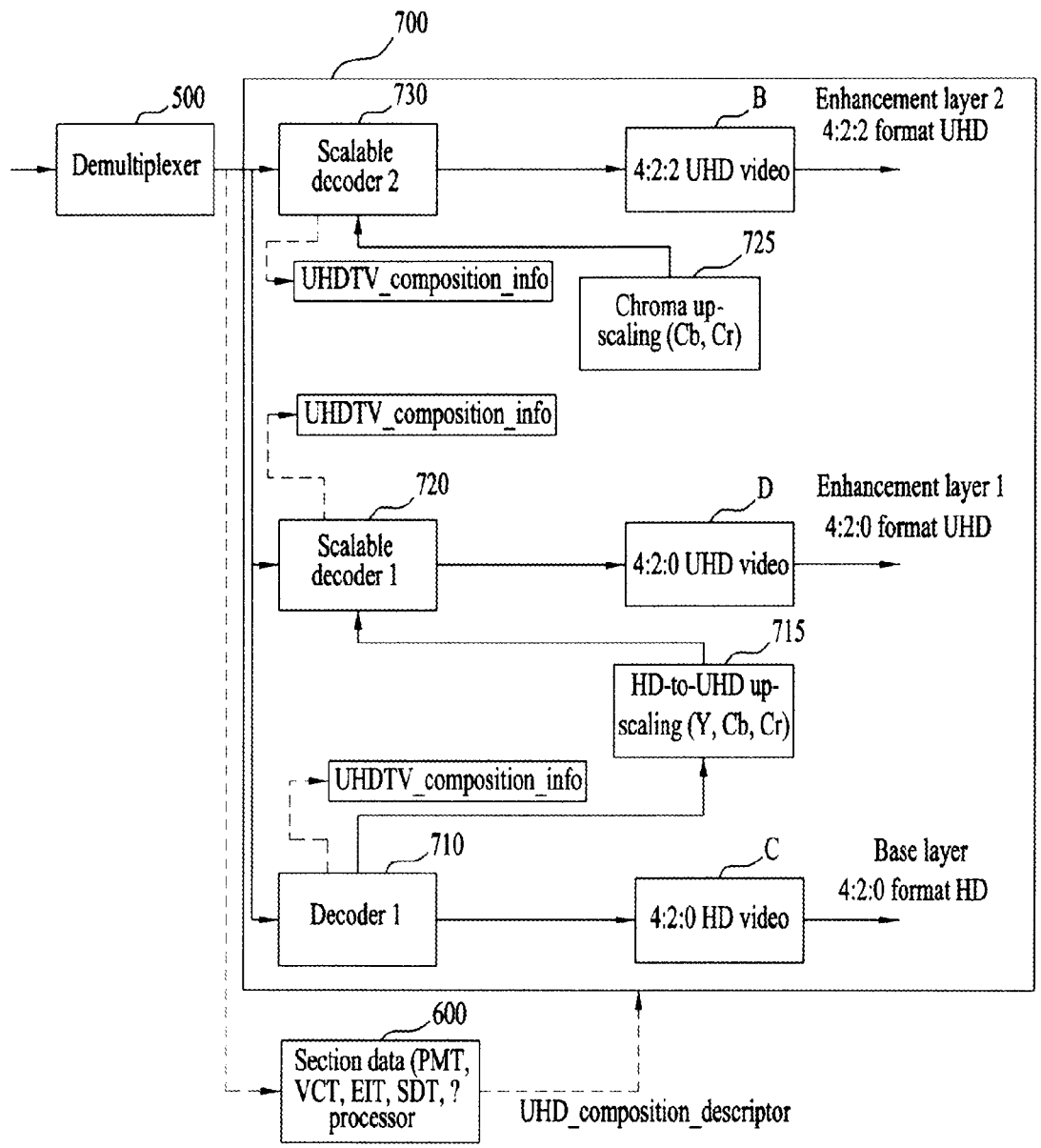
FIG. 26 is a diagram illustrating a signal receiving apparatus according to an embodiment of the present invention.

FIG. 26 is a diagram illustrating a signal receiving apparatus according to an embodiment of the present invention.

The signal receiving apparatus may include a demultiplexer 500, a signaling information decoder 600, and a video decoder 700.

The demultiplexer 500 may demultiplex video streams and signaling information according to an embodiment of the present invention. For example, the video streams may include the streams illustrated in FIG. 7.

The signaling information decoder 600 may decode some of the signaling information illustrated in FIGS. 15 to 24 according to receiver performance. The video decoder 700 may know that video data is coded to a plurality of layer data items based on program format type information (UHD_program_format_type) in the signaling information.

The video decoder 700 may include at least one video decoder of a first decoder 710, a second decoder 720, and a third decoder 730 according to receiver performance. For example, the video decoder 700 may include the first decoder 710, or include the first decoder 710 and the second decoder 720, or include the first decoder 710, the second decoder 720, and the third decoder 730.

The first decoder 710 may receive a stream for transmission of base layer data based on video composition metadata information (UHD_composition_metadata) of signaling information, decode the base layer data, and decode and output 4:2:0 sampling video data C. The base layer data may include video composition metadata information (UHD_composition_metadata) of video data in the video data region illustrated in FIG. 25, and the first decoder 710 may decode the base layer data according to video composition metadata information (UHD_composition_metadata) to output 4:2:0 sampling video data C.

A first upscaler 715 may upscale and output 4:2:0 sampling HD video data as base layer data to high resolution (UHD) video with respect to a luminance Y component and chroma Cb and Cr components.

The second decoder 720 may decode residual data of a 4:2:0 UHD video as enhancement layer 1 and the HD video data upscaled by the first upscaler 715 based on video composition metadata information (UHD_composition_metadata) of the signaling information to output 4:2:0 UHD video data.

Residual data of a 4:2:0 UHD video as enhancement layer 1 may include video composition metadata information (UHD_composition_metadata) of video data in the video data region illustrated in FIG. 25, and the second decoder 720 may decode 4:2:0 UHD video data D according to video composition metadata information (UHD_composition_metadata).

A second upscaler 725 may upscale and output chroma Cb and Cr components of 4:2:0 sampling UHD video data as enhancement layer 1 data.

The third decoder 730 may decode residual data of chroma Cb and Cr components of a 4:2:2 UHD video as enhancement layer 2 and UHD video data with chroma Cb and Cr components upscaled by the second upscaler 725 based on video composition metadata information (UHD_composition_metadata) of the signaling information to output 4:2:2 UHD video data B.

Figure 27:
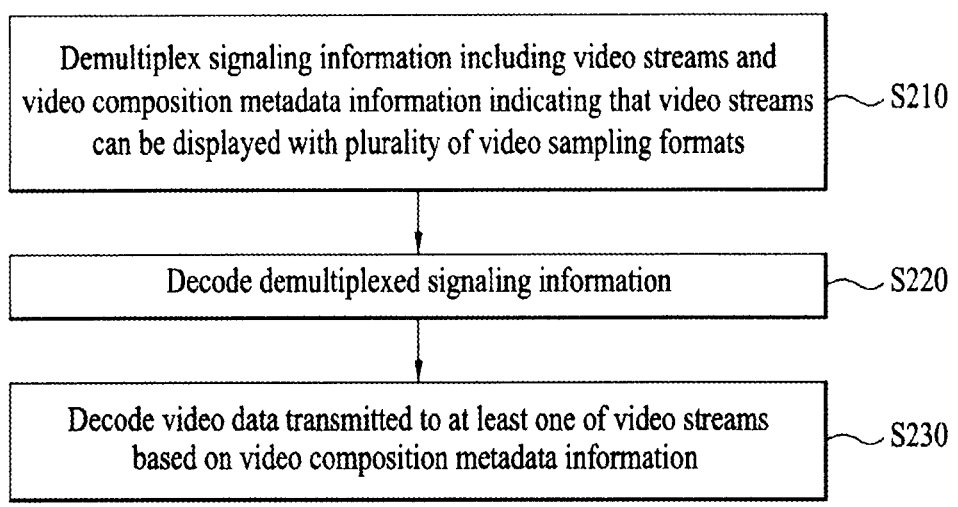
FIG. 27 is a diagram illustrating a signal receiving method according to an embodiment of the present invention.

FIG. 27 is a diagram illustrating a signal receiving method according to an embodiment of the present invention.

In the signal receiving method according to an embodiment of the present invention, signaling information including video streams and video composition metadata information (UHD_composition_metadata) indicating that the video streams can be displayed with a plurality of video sample formats is demultiplexed (S210). The signaling information may be demultiplxed only when a received signal is a broadcasting signal.

The received video streams may include video data of sampling at a ratio of 4:2:2 of a luminance component Y and chroma components Cb and Cr. In addition, video data of sampling at a ratio of 4:2:2 of the luminance component Y and the chroma components Cb and Cr may include video data of sampling at a ratio of 4:2:0 of the luminance component Y and the chroma components Cb and Cr, and residual data of the chroma components Cb and Cr, and video composition metadata information (UHD_composition_metadata).

A configuration of a video transmitted in the received video stream may comply with the configuration illustrated in FIG. 7. That is, the transport video stream A for providing a 4:2:2 sampling UHD video service may include the stream B for providing a 4:2:0 sampling UHD video service, the Cb residual data E, the Cr residual data F, and the metadata G as signaling data. The stream B for providing the 4:2:0 sampling UHD video service may include the 4:2:0 sampling HD video stream C for providing an existing HD video service for a receiver for receiving and displaying an existing HD video and the enhancement layer data D for 4:2:0 sampling 4K UHD video data.

When a received signal is a broadcasting signal, the signaling information illustrated in FIGS. 15 to 24 may be demultiplexed separately from video data.

When the received signal is a broadcasting signal, the demultiplexed signaling information may be decoded (S220). When the received signal is not a broadcasting signal, operation S220 may be omitted, and information obtained by decoding signaling information in video data may be used during the following video data decoding operation.

video composition metadata information (UHD_composition_metadata) may indicate that video streams include video data with sampling at a ratio of 4:2:0 of the luminance component Y and the chroma components Cb and Cr and residual data of the chroma components Cb and Cr. An example of the decoded signaling information is illustrated in FIGS. 15 to 24.

Video data transmitted in at least one of the video streams is decoded based on video composition metadata information (UHD_composition_metadata) (S230).

For example, as illustrated in FIG. 26, when video data is decoded based on video composition metadata information (UHD_composition_metadata) according to receiver performance 4:2:0 HD video data, 4:2:0 UHD video data, or 4:2:2 UHD video data may be decoded. The video data decoding process has been described with reference to FIG. 14 or 26.

Figure 28:
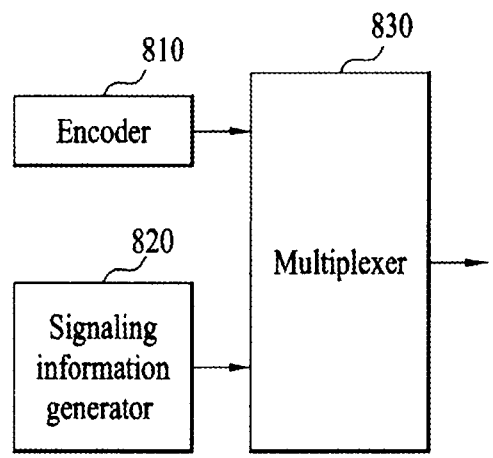
FIG. 28 is a diagram illustrating a signal transmitting apparatus according to an embodiment of the present invention.

FIG. 28 is a diagram illustrating a signal transmitting apparatus according to an embodiment of the present invention.

The signal transmitting apparatus according to an embodiment of the present invention may include an encoder 810, a signaling information generator 820, and a multiplexer 830.

The encoder 810 encodes video data. When the encoder 810 encodes video data, video composition metadata information (UHD_composition_metadata) as encoding information of the video data may be added to the encoded video data.

The encoded video data may include video data of sampling at a ratio of 4:2:2 of the luminance component Y and the chroma components Cb and Cr, and the video data of sampling at a ratio of 4:2:2 of the luminance component Y and the chroma components Cb and Cr may include video data of sampling at a ratio of 4:2:0 of the luminance component Y and the chroma components Cb and Cr, residual data of the chroma components Cb and Cr, and video composition metadata information (UHD_composition_metadata).

video composition metadata information (UHD_composition_metadata) of the encoded video data has been described in detail with reference to FIG. 7 (video composition metadata information (UHD_composition_metadata)) and FIG. 25. The encoder 810 may scalably encode video data to various layer data items according to subsampling and resolution. An example of encoding video data is illustrated in FIGS. 8 and 9. In addition, when a scanning method needs to be changed according to subsampling and resolution of video data during encoding, the scanning method of video data may be changed using the method of FIGS. 11 to 13.

When a transport signal is a broadcasting signal, the signal transmitting apparatus according to an embodiment of the present invention includes the signaling information generator 820 separately from the encoder 810.

The signaling information generator 820 generates signaling information including video composition metadata information (UHD_composition_metadata) for displaying the video data encoded by the encoder 810 with a plurality of video sampling formats. Video data and separate signaling information are illustrated in FIGS. 15 to 24.

Video composition metadata information (UHD_composition_metadata) may indicate that the encoded video data includes video data with sampling at a ratio of 4:2:0 of the luminance component Y and the chroma components Cb and Cr and residual data of the chroma components Cb and Cr.

The multiplexer 830 may multiplex the encoded video data and the signaling information and output the multiplexed video data and signaling information. When transmission data is not a broadcasting signal, the signaling information generator 820 for generating video data and the multiplexed signaling information is omitted, and the multiplexer 830 multiplexes and outputs different data (e.g., audio data) from video data including video composition metadata information (UHD_composition_metadata) in a video data region encoded by the encoder 810.

According to an embodiment of the present invention, the signal transmitting apparatus may transmit signaling information for selectively compositing a 4:2:0 sampling HD video, a 4:2:0 UHD video, or a 4:2:2 UHD video and video data based on the composition so as to display video data according to receiver performance and subsampling type of video data.

Figure 29:
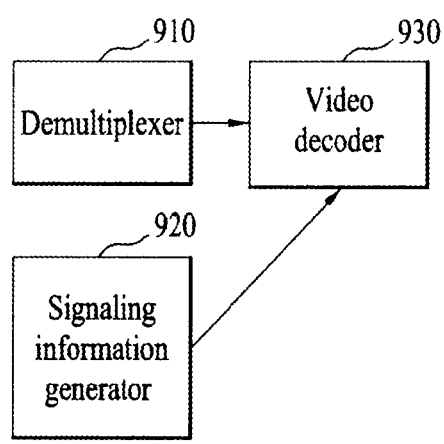
FIG. 29 is a diagram illustrating a signal receiving apparatus according to an embodiment of the present invention.

FIG. 29 is a diagram illustrating a signal receiving apparatus according to an embodiment of the present invention.

The signal receiving apparatus according to an embodiment of the present invention may include a demultiplexer 910, a signaling information decoder 920, and a video decoder 930.

The demultiplexer 910 demultiplexes a video stream and signaling information. The signaling information is demultiplexed only when the received signal is a broadcasting signal. Configurations of the demultiplexed video streams are illustrated in FIG. 7. As illustrated in FIG. 7, the demultiplxed video stream may include video composition metadata information (UHD_composition_metadata) of video data, and syntax thereof has been described in detail with reference to FIG. 25.

Video streams may include video data of sampling at a ratio of 4:2:2 of a luminance component Y and chroma components Cb and Cr. The video data of sampling at a ratio of 4:2:2 of a luminance component Y and chroma components Cb and Cr may include video data of sampling at a ratio of 4:2:0 of a luminance component Y and chroma components Cb and Cr, residual data of the chroma components Cb and Cr, and video composition metadata information (UHD_composition_metadata).

When the received video stream includes a broadcasting signal, the demultiplexer 910 may demultiplex signaling information of FIGS. 15 to 24, which is transmitted separately from video data, and when the received video stream is not a broadcasting signal, the signaling information may be included in video composition metadata information (UHD_composition_metadata) illustrated in FIG. 7.

When the received signal is a broadcasting signal, the signaling information decoder 920 decodes the demultiplexed signaling information. The demultiplexed signaling information may include the information items illustrated in FIGS. 15 to 24, and the illustrated information items may be decoded in some embodiments. When the received signal is not a broadcasting signal, the signaling information decoder 920 may be omitted, and information obtained by decoding signaling information in video data may be used in the following video data decoding process.

Video composition metadata information (UHD_composition_metadata) may indicate that video streams include video data with sampling at a ratio of 4:2:0 of the luminance component Y and the chroma components Cb and Cr and residual data of the chroma components Cb and Cr.

The video decoder 930 decodes video data according to video composition metadata information (UHD_composition_metadata) in a video data region or as signaling information decoded by the signaling information decoder 920, in some embodiments. A detailed example of the video decoder 930 has been described in detail with reference to FIG. 26.

Accordingly, the signal receiving apparatus according to an embodiment of the present invention may selectively output a 4:2:0 sampling HD video, a 4:2:0 UHD video, or a 4:2:2 UHD video according to receiver performance and a subsampling type of video data.

Accordingly, according to an embodiment of the present invention, upon transmitting a configuration of video data, as illustrated in FIG. 7, a transmitting apparatus may acquire information about a configuration of signaling information from the signaling information and decode and output video data according to receiver performance.

Mode for Invention

Various embodiments have been described in the best mode for carrying out the invention.

INDUSTRIAL APPLICABILITY

The present invention is applicable in broadcasting and video signal processing fields and repetitive industrial fields.

The invention claimed is:

1. A method of transmitting a signal, the method comprising:
    encoding video data wherein the encoded video data includes Ultra-high-definition (UHD) video data and the UHD video data is changed to HD video data and residual data,
    wherein the UHD video data has a sampling rate of 4:2:2 or 4:4:4 of a luminance component Y and chroma components Cb and Cr,
    wherein the HD video data has a sampling rate of 4:2:0 of a luminance component Y and chroma components Cb and Cr, and
    wherein the residual data represents difference between the UHD video data and the HD video data by subsampling the UHD video data;
    generating signaling information comprising video composition metadata information for displaying the UHD video data or the HD video data with a plurality of video sampling formats; and
    multiplexing the encoded video data and the signaling information and transmitting the multiplexed video data and signaling information into broadcast data,
    wherein the signaling information includes a subsampling type of the UHD video data and information on a video type of the encoded video data.

2. The method according to claim 1, wherein the UHD video data is encoded using a scalable High Efficiency Video Coding method.

3. The method according to claim 2, wherein the broadcast data comprises video data of sampling at a ratio of 4:2:0 of the luminance component Y and the chroma components Cb and Cr, residual data of the chroma components Cb and Cr, and the video composition metadata information.

4. The method according to claim 1, wherein the signaling information includes further include filter information for a chroma upscaling method.

5. A signal transmitting apparatus comprising:
    an encoder for encoding video data wherein the encoded video data includes Ultra-high-definition (UHD) video data and the UHD video data is changed to HD video data and residual data,
    wherein the UHD video data has a sampling rate of 4:2:2 or 4:4:4 of a luminance component Y and chroma components Cb and Cr,
    wherein the HD video data has a sampling rate of 4:2:0 of a luminance component Y and chroma components Cb and Cr, and wherein the residual data represents difference between the UHD video data and the HD video data by subsampling the UHD video data;

a signaling information generator for generating signaling information comprising video composition metadata information for displaying the UHD video data or the HD video data with a plurality of video sampling formats; and a multiplexer for multiplexing the encoded video data and the signaling information into broadcast data, wherein the signaling information includes a subsampling type of the UHD video data and information on a video type of the encoded video data.

6. The signal transmitting apparatus according to claim 5, wherein the UHD video data is encoded using a scalable High Efficiency Video Coding method.

7. The signal transmitting apparatus according to claim 6, wherein the broadcast data comprises video data of sampling at a ratio of 4:2:0 of the luminance component Y and the chroma components Cb and Cr, residual data of the chroma components Cb and Cr, and the video composition metadata information.

8. The signal transmitting apparatus according to claim 5, wherein the signaling information includes further include filter information for a chroma upscaling method.

* * * * *